United States Patent
Amino et al.

(10) Patent No.: US 9,769,362 B2
(45) Date of Patent: Sep. 19, 2017

(54) MOUNTING ADAPTER

(71) Applicant: OLYMPUS CORPORATION, Shibuya-ku, Tokyo (JP)

(72) Inventors: Hiroki Amino, Akiruno (JP); Kazu Suzuki, Toda (JP)

(73) Assignee: Olympus Corporation, Tokyo (JP)

(*) Notice: Subject to any disclaimer, the term of this patent is extended or adjusted under 35 U.S.C. 154(b) by 4 days.

(21) Appl. No.: 14/875,324

(22) Filed: Oct. 5, 2015

(65) Prior Publication Data

US 2016/0105593 A1    Apr. 14, 2016

(30) Foreign Application Priority Data

Oct. 9, 2014   (JP) ................. 2014-208199

(51) Int. Cl.
- *H04N 5/225* (2006.01)
- *G03B 17/56* (2006.01)
- *G03B 17/04* (2006.01)
- *H04M 1/02* (2006.01)

(52) U.S. Cl.
CPC .......... *H04N 5/2252* (2013.01); *G03B 17/04* (2013.01); *G03B 17/566* (2013.01); *H04M 1/0264* (2013.01)

(58) Field of Classification Search
CPC ...... G03B 17/48; G03B 17/565; G03B 17/14; H04N 5/2254; H04W 88/02
See application file for complete search history.

(56) References Cited

U.S. PATENT DOCUMENTS

2015/0049203 A1* 2/2015 Okabe ................. G03B 17/02
                                                     348/207.1

FOREIGN PATENT DOCUMENTS

JP    2015-084505    4/2015

OTHER PUBLICATIONS

DP Review, Sony introduces QX1 with APS-C sensor and E-mount for smartphones, https://www.dpreview.com/articles/1313222874/sony-introduces-qx1-with-aps-c-sensor-and-e-mount-for-smartphones, Sep. 3, 2014.*

* cited by examiner

*Primary Examiner* — Nelson D. Hernández Hernández
(74) *Attorney, Agent, or Firm* — John C. Pokotylo; Pokotylo Patent Services

(57) ABSTRACT

A mounting adapter includes: a first body section having a connection section attached to one side of an accessory device and a first holding arm that holds one side face of a portable type electronic device, a second body section having a second holding arm that is provided to project/retract from inside to outside and holds a side face of the portable type electronic device, a second holding arm urging member that urges the second holding arm in a direction opposite to the direction in which the second holding arm extends, and a hinge member that connects the first body section and the second body section, and the mounting adapter sandwiches the portable type electronic device between the first holding arm and the second holding arm in an open state when in use.

20 Claims, 14 Drawing Sheets

MOUNTING ADAPTER

This application claims the benefit of Japanese Application No. 2014-208199 filed in Japan on Oct. 9, 2014, the contents of which are incorporated herein by this reference.

BACKGROUND OF THE INVENTION

1. Field of the Invention

The present invention relates to a mounting adapter which is interposed between an accessory device and a portable electronic device to integrate the two.

2. Description of Related Art

In recent years, portable type electronic devices such as smartphones and tablet type computers are becoming widespread. Some of these conventional portable type electronic devices are configured by incorporating a camera unit including, for example, an optical system lens and an image pickup device and provided with an image pickup function for picking up a still image or a movie.

Such conventional portable type electronic devices are generally configured to be small-sized and light-weighted so as to be carried along by users all the time and available outdoors or at remote locations if necessary as appropriate. The users of such portable type electronic devices carry along their devices all the time or often do not carry along, for example, conventional common image pickup apparatuses (hereinafter simply abbreviated as "cameras") such as cameras. Even in such cases, the users use the image pickup function of the camera unit incorporated in the above-described portable type electronic devices, and can thereby pick up still images or movies and acquire desired images easily and at any time in recent years.

However, since the camera units incorporated in such portable type electronic devices are of accessory functions of the electronic devices, image pickup performance thereof is undeniably inferior to that of normal cameras or the like.

Thus, conventionally, various proposals have been presented and have been put to practical use regarding a variety of accessory devices provided with functions for assisting an image pickup function or an image browsing function among functions provided for such portable type electronic devices, or functions for substituting those functions.

Examples of accessory devices used by being attached to conventional portable type electronic devices include an interchangeable lens unit with an image pickup device with unitized high performance image pickup device and image pickup lens applicable to common cameras or the like, and an intermediate barrel with an image pickup device configured to be mountable with an interchangeable lens barrel provided for conventional common cameras with interchangeable lenses and provided with a high performance image pickup device. These accessory devices function as accessory devices capable of substituting image pickup functions or the like of corresponding portable type electronic devices.

In addition, examples of accessory devices used by being attached to conventional portable type electronic devices include an accessory device for assisting, when a portable type electronic device is used to display images and used as an image browsing display apparatus, and when the portable type electronic device is placed on a plane such as a table, an image browsing function such as a support mount to stabilize and make self-sustaining the display screen at a desired angle, an auxiliary light emission unit that causes illuminating light during image pickup to be emitted as auxiliary light, an accessory device for assisting an illumination apparatus or the like in image pickup, and other various devices.

Examples of possible modes of attaching such various accessory devices to a portable type electronic device include one that interposes a mounting adapter between each accessory device and the portable type electronic device.

For example, a mounting adapter disclosed in Japanese Patent Publication No. 5541430 is provided with a connection section that connects and fixes an accessory device using means such as bayonet coupling, a mounting arm section that is urged in a tightening direction, and a fixed arm section placed opposite to this mounting arm section, an optional portable type electronic device is disposed so as to be interposed between the above-described two arm sections with the accessory device being attached to the connection section so that the mounting adapter is interposed between the accessory device and the portable type electronic device to integrate the two.

In general, when performing an operation of attaching an accessory device to a conventional portable type electronic device, the user holds the portable type electronic device by one hand and holds the accessory device by the other hand to attach the accessory device.

SUMMARY OF THE INVENTION

A mounting adapter according to an aspect of the present invention is a mounting adapter that is interposed between an accessory device and a portable type electronic device for integrally connecting both devices, including a first body section having a connection section attached to one surface of the accessory device and a first holding arm that holds one side face of the portable type electronic device, a second body section having a second holding arm that is movably provided so as to project/retract from inside to outside to hold another surface opposite to the one surface of the portable type electronic device, a second holding arm urging member that urges the second holding arm in a direction opposite to a direction in which the second holding arm projects outward, and a hinge member that connects the first body section and the second body section, and when the mounting adapter is in an open state when in use, the mounting adapter sandwiches the portable type electronic device between the first holding arm and the second holding arm.

Benefits of the invention will become more apparent from the following detailed description.

DETAILED DESCRIPTION OF THE PREFERRED EMBODIMENTS

Hereinafter, the present invention will be described using an embodiment illustrated in the accompanying drawings. The respective drawings used for the following description are shown schematically and may show the respective components by changing dimensional relationships among the respective members and scales from one component to another to illustrate the respective components in a recognizable manner on the drawings. Therefore, the present invention is not limited only to the illustrated modes regarding the quantity of components described in the respective drawings, the shape of the components, ratios in size among the components and relative positional relationships among the respective components.

[Schematic Configuration of Overall Image Pickup System]

Figure 1:
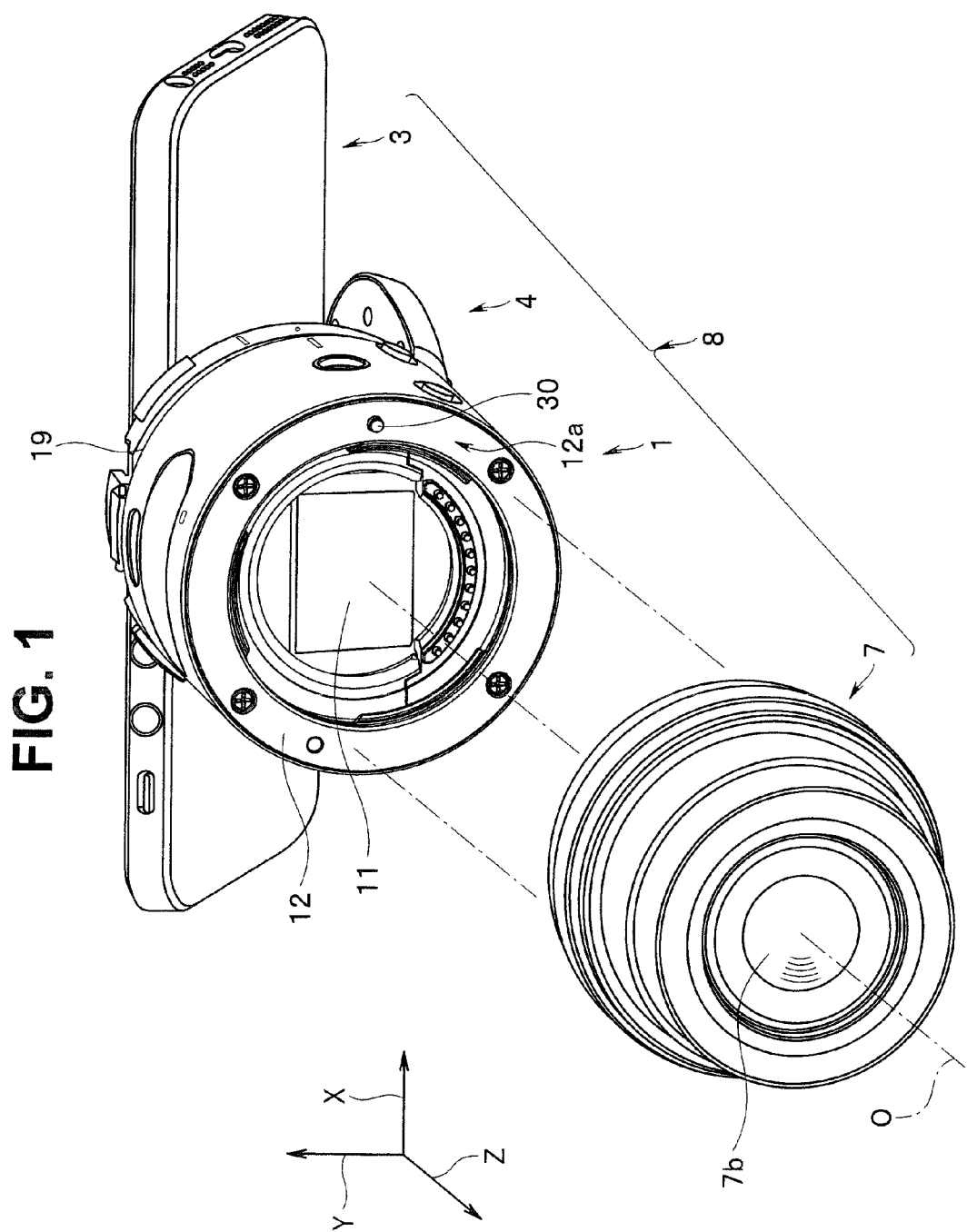
FIG. 1 is an external perspective view illustrating an overall image pickup system including a mounting adapter according to an embodiment of the present invention and an accessory device that uses it.
Figure 2:
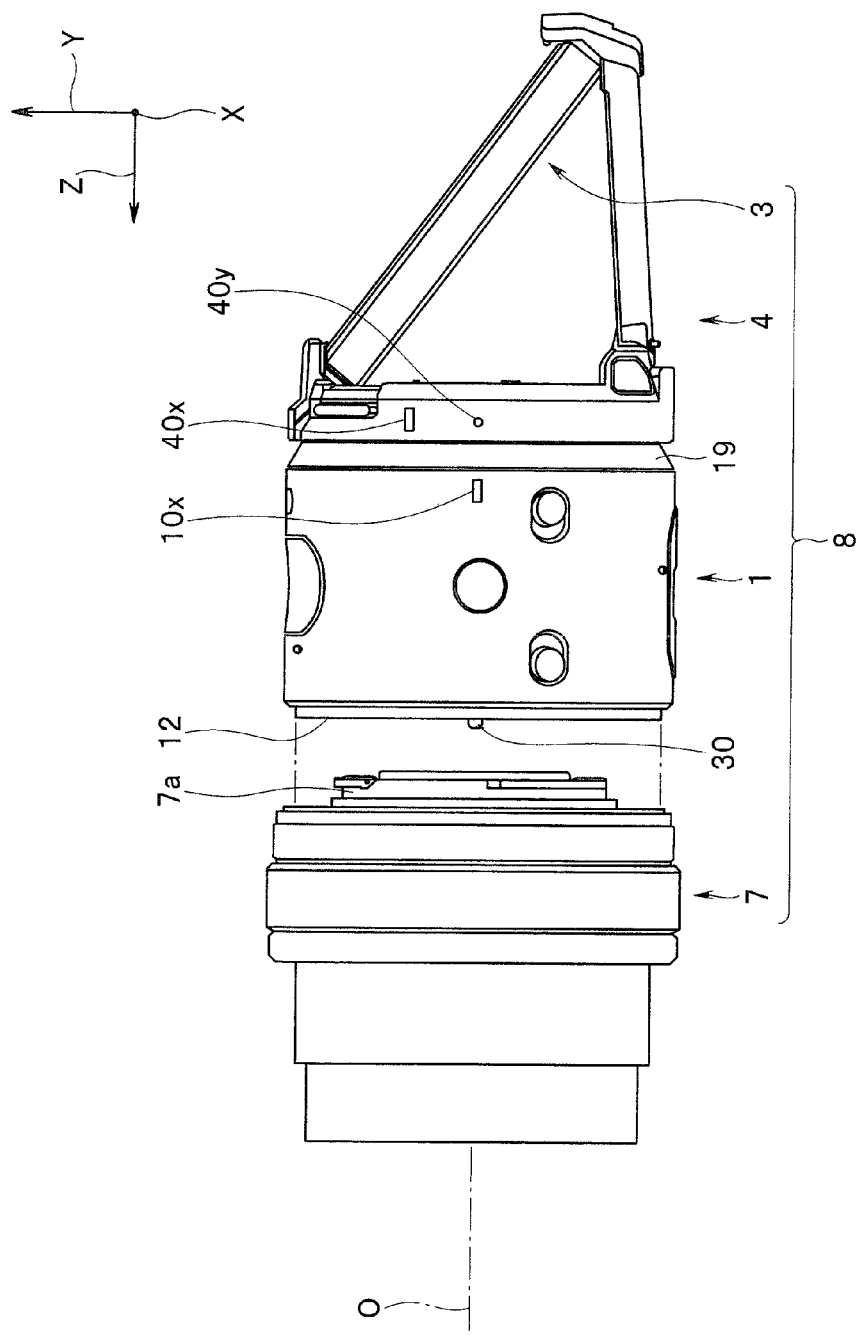
FIG. 2 is a right side view illustrating a right side face of a lens barrel in the image pickup system of FIG. 1.

First, FIG. 1 and FIG. 2 show an overall configuration of an image pickup system including the mounting adapter according to an embodiment of the present invention and an accessory device using it. FIG. 1 and FIG. 2 are diagrams illustrating the overall image pickup system including the mounting adapter according to the embodiment of the present invention and the accessory device using this. Of these drawings, FIG. 1 is an external perspective view. FIG. 2 is a right side view illustrating the right side face of the lens barrel. Note that FIG. 1 and FIG. 2 illustrate an aspect of an image pickup system including the mounting adapter according to the embodiment of the present invention and an intermediate barrel with an image pickup device as the accessory device using this mounting adapter.

As shown in FIG. 1 and FIG. 2, the mounting adapter 4 according to the present embodiment is a device connection configuration unit for substantially integrally connecting the intermediate barrel with an image pickup device 1 which is an accessory device and functions as an image pickup apparatus and a portable type electronic device 3 which is another configuration unit and is provided with a communication function, a control function and an image display function. Here, if a lens barrel 7 is mounted to the front of the intermediate barrel with an image pickup device 1, an image pickup system 8 is constructed which functions as one image pickup apparatus.

The image pickup system 8 constructed in this way is configured by combining the above-described various configuration units and thereby constitutes an image pickup system configured by including a function of transmitting the acquired image data or the like to the outside using various modes of wireless communication channels in addition to the image pickup function and image and information display function substantially equivalent to those of conventional and generally popular image pickup apparatuses such as digital cameras. Note that in the following description, the direction along the optical axis O of the image pickup optical system of the lens barrel 7 as shown in FIG. 1 is assumed to be the Z-axis. The direction which is orthogonal to the Z-axis and the vertical direction of the intermediate barrel with an image pickup device 1 is assumed to be the Y-axis and that of the horizontal direction is likewise assumed to be X-axis.

Here, the mounting adapter 4 functions as a configuration unit interposed between two different devices, for example, the intermediate barrel with an image pickup device 1 which is an accessory device and an image pickup device, and the portable type electronic device 3 which is a control device and a display device, for integrally connecting both devices (the intermediate barrel with an image pickup device 1 and the portable type electronic device 3). That is, the mounting adapter 4 is a mounting apparatus for connection to attach the intermediate barrel with an image pickup device 1 which is an accessory device to the existing portable type electronic device 3. Therefore, when used as the image pickup system shown in FIG. 1 and FIG. 2, the mounting adapter 4 is configured so as to sandwich and hold the portable type electronic device 3 on the rear side thereof with the intermediate barrel with an image pickup device 1 mounted to the front side thereof. Note that a detailed configuration of the mounting adapter 4 of the present embodiment will be described later (see FIG. 6 to FIG. 14).

The intermediate barrel with an image pickup device 1 is an accessory device having functions substantially equivalent to those of image pickup apparatuses such as conventional digital cameras. For this reason, the intermediate barrel with an image pickup device 1 is constructed by including the image pickup unit including the image pickup device 11 (see FIG. 1) and a battery (not shown) as a power supply battery or the like inside, a mount ring 12 which is a mount section for mounting the lens barrel 7 on the front and an adapter mounting section 19 that mounts the mounting adapter 4 on the rear face.

Note that a lock pin 30 is disposed on a mount surface 12a (see FIG. 1) of the mount ring 12, the lock pin 30 being provided so as to be freely projectable outward or retractable. The lock pin 30 is a member making up part of a lock mechanism provided to regulate the rotation of the lens barrel 7 attached to the front of the intermediate barrel with an image pickup device 1 and maintain the mounted state. The rest of the configuration of the intermediate barrel with an image pickup device 1 according to the present embodiment will be described later (see FIG. 3 to FIG. 8).

The lens barrel 7 is an interchangeable lens barrel generally provided for conventional lens interchangeable cameras. Note that the lens barrel 7 shown in FIG. 1 and FIG. 2 simply illustrates an exemplary mode of conventional interchangeable lens barrel. The lens barrel 7 includes an image pickup optical system 7b that forms an object image (see FIG. 1) and a drive mechanism or a drive circuit (not shown) that drives this. A lens mount 7a (see FIG. 2) coupled with the mount ring 12 of the intermediate barrel with an image pickup device 1 is provided on the rear face of the lens barrel 7. In this way, the lens barrel 7 is detachably attached to the front of the intermediate barrel with an image pickup device 1.

Note that as described above, various interchangeable lens barrels generally provided for conventional lens interchangeable cameras are used as the lens barrel 7. Therefore, regarding the configuration of the lens barrel 7, the lens barrel 7 is assumed to be provided with a configuration similar to that of a conventional interchangeable lens barrel, and description and illustration of the detailed configuration thereof will be omitted.

The portable type electronic device 3 is a portable type electronic device that has a case size so that it can be handled by one hand of the user and is formed into a plate-like shape as a whole. The portable type electronic device 3 is a small portable type electronic device provided with an image display unit (image display section) including, for example, 4 to 5.5-inch display panel and an image information display function, incorporating a communication unit (communication section) that implements various modes of communication functions (wireless communication; wireless LAN, Wi-Fi (wireless fidelity), Bluetooth, NFC (near field communication), wired communication; USB or the like) and a signal processing circuit that performs signal processing on image signals and communication signals or the like and a control circuit (control section) that controls each configuration unit.

The portable type electronic device 3 functions as a control device for controlling the intermediate barrel with an image pickup device 1 by operating in connection with the intermediate barrel with an image pickup device 1 using wireless communication and functions as an image display apparatus that receives image data acquired in the intermediate barrel with an image pickup device 1 and displays an image based on the received image data on a display panel (also including a live view display or the like in addition to image playback display). As the portable type electronic device 3, more specifically, a high function cellular phone set, a so-called smartphone, is assumed to be used, but without being limited to this, other modes of electronic devices may also be used if these devices are provided with equivalent functions.

Note that as the portable type electronic device 3 applicable to the image pickup system, various conventionally popular portable type electronic devices (smartphones or the like) can be used. That is, when constructing the image pickup system, the user can alternatively use existing portable type electronic devices 3, that is, various types of portable type electronic devices 3 already acquired and in use. Therefore, the portable type electronic device 3 is assumed to have a configuration similar to that of a conventional portable type electronic device, and description and illustration of the detailed configuration will be omitted.

The image pickup system configured as described above is an image pickup system constructed by integrally connecting a main image pickup unit formed by mounting the lens barrel 7 to the intermediate barrel with an image pickup device 1 and the existing portable type electronic device 3 with the mounting adapter 4 interposed therebetween.

In this image pickup system, the portable type electronic device 3 wirelessly communicates with the intermediate barrel with an image pickup device 1, the control circuit of the portable type electronic device 3 performs control on the above-described main image pickup unit, and the system is thereby configured to be able to remotely execute various operations including an image pickup operation. More specifically, for example, it is possible to transmit various control signals from the portable type electronic device 3 to control the intermediate barrel with an image pickup device 1, perform drive control on the lens barrel 7 via the intermediate barrel with an image pickup device 1 or transmit the image data acquired by the intermediate barrel with an image pickup device 1 to the portable type electronic device 3, and cause the image display section of the portable type electronic device 3 to display the image or the like.

Note that the image pickup system in the aforementioned mode has been described as a system configured by integrally connecting the main image pickup unit formed by mounting the lens barrel 7 to the intermediate barrel with an image pickup device 1 and the existing portable type electronic device 3 via the mounting adapter 4, so as to have functions equivalent to those of a conventional image pickup apparatus, but the present invention is not limited to such a mode of use.

For example, the above-described intermediate barrel with an image pickup device 1 and portable type electronic device 3 are configured to transmit/receive control signals and image data or the like through wireless communication. Therefore, even when the respective configuration units are not integrally connected, the system can be used as an image pickup system. That is, even when the intermediate barrel with an image pickup device 1 with the lens barrel 7 mounted thereto (main image pickup unit) and the existing portable type electronic device 3 are separated apart, both devices are connected together through wireless communication, and so various types of control and data transmission/reception are possible, and even in such a mode of use, both devices can be used as the image pickup system. In such a mode of use, the mounting adapter 4 can be stored by being mounted to the rear side of the intermediate barrel with an image pickup device 1 and can be used without losing an operation feeling or sense of use.

[Configuration of Intermediate Barrel with Image Pickup Device]

Next, the configuration of the intermediate barrel with an image pickup device 1 which is an accessory device used by being mounted to the mounting adapter 4 according to the present embodiment will be described below using mainly FIG. 3 to FIG. 8.

[Schematic Configuration of Intermediate Barrel with Image Pickup Device]

Figure 3:
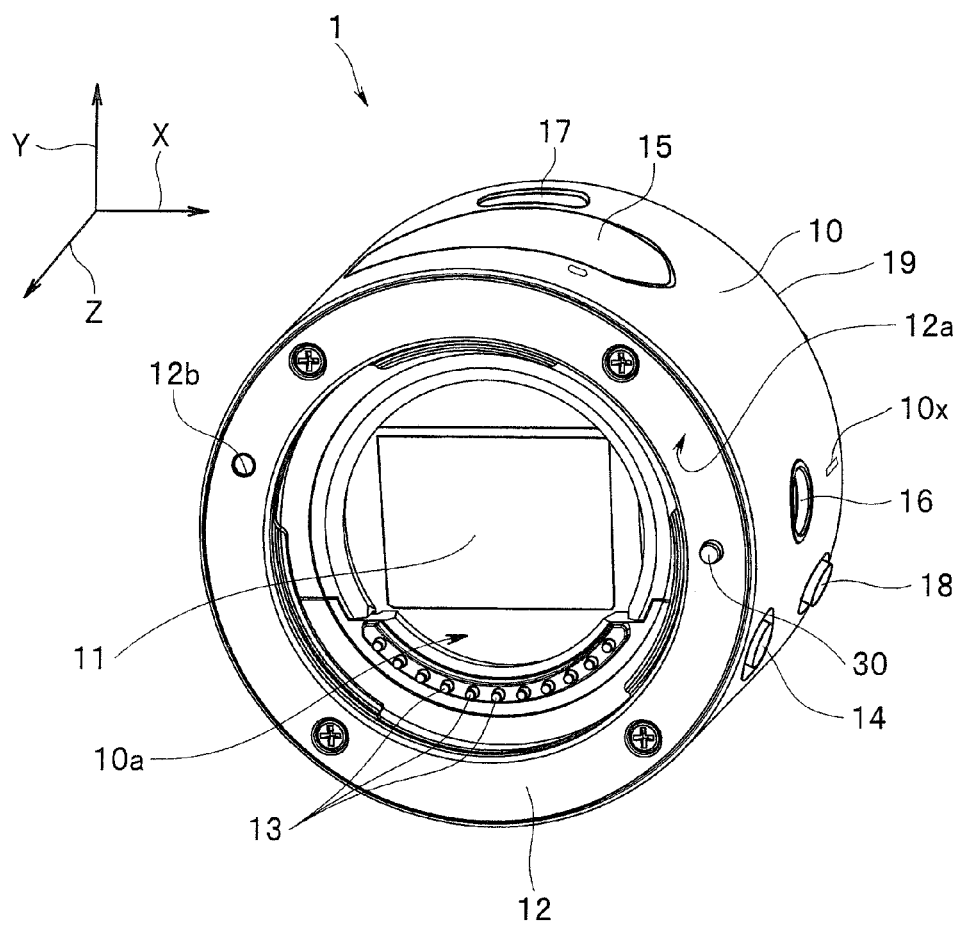
FIG. 3 is an external perspective view illustrating an intermediate barrel with an image pickup device which is an accessory device using the mounting adapter according to the embodiment of the present invention.
Figure 4:
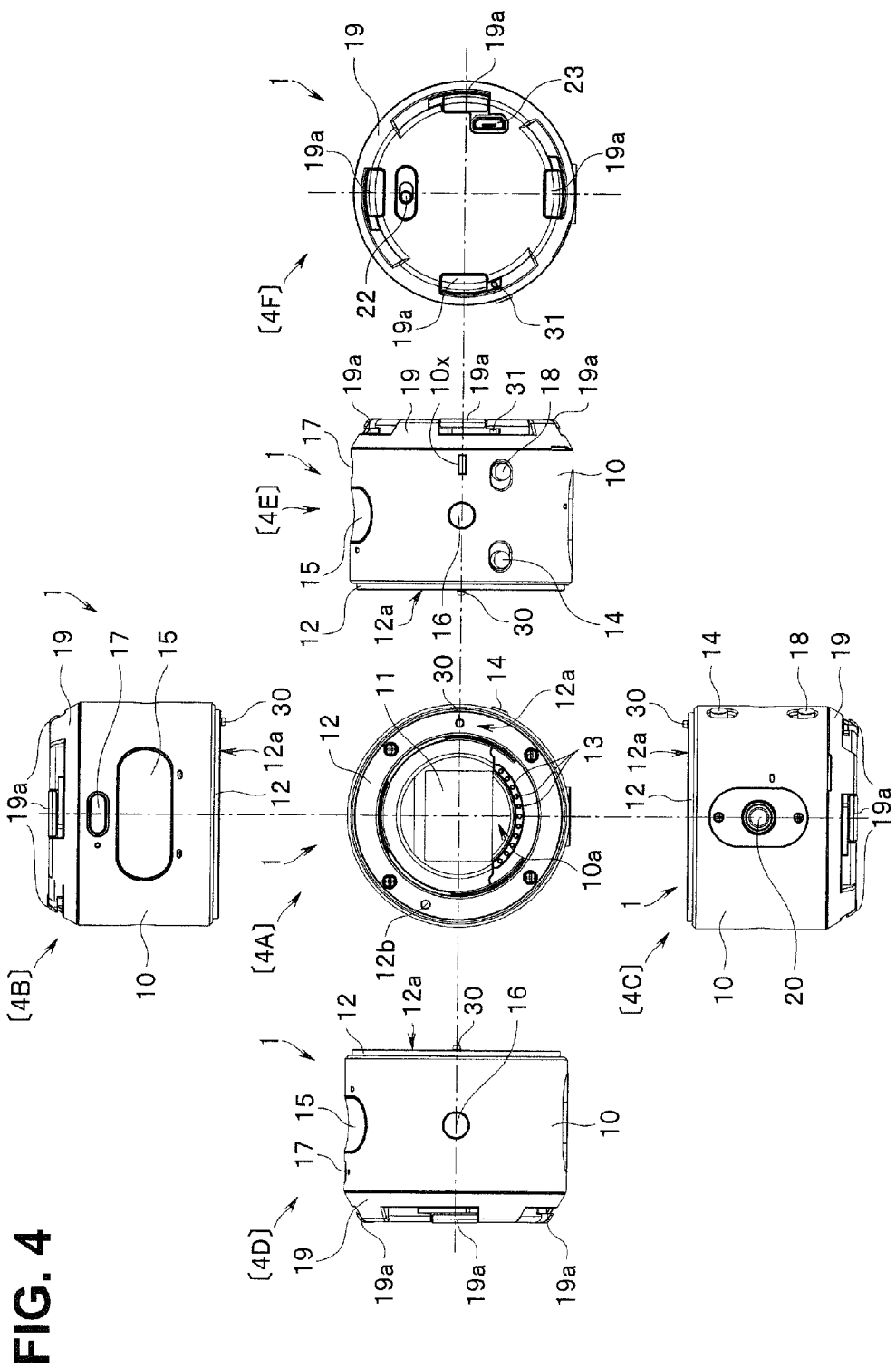
FIG. 4 is a six-sided view of the intermediate barrel with an image pickup device of FIG. 3.
Figure 5:
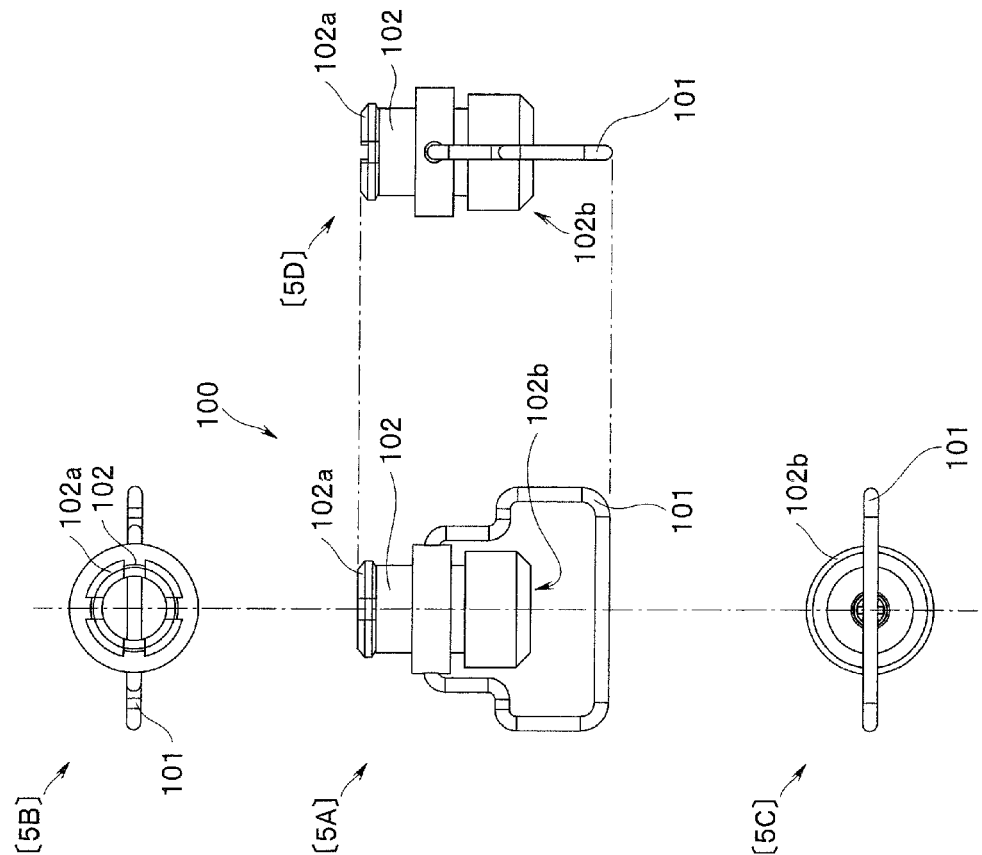
FIG. 5 is a four-sided view of a strap mounting hanging bracket mounted to the intermediate barrel with an image pickup device of FIG. 3.

First, a schematic configuration of the intermediate barrel with an image pickup device 1 will be described below using FIG. 3 to FIG. 5. FIG. 3 is an external perspective view illustrating the intermediate barrel with an image pickup device which is an accessory device using the mounting adapter according to the embodiment of the present invention. FIG. 4 is a six-sided view of the intermediate barrel with an image pickup device of FIG. 3. In these drawings, reference character [4A] denotes a front view, reference character [4B] denotes a top view, reference character [4C] denotes a bottom view, reference character [4D] denotes a left side view, reference character [4E] denotes a right side view, and reference character [4F] denotes a rear view, respectively. FIG. 5 is a four-sided view of a strap mounting hanging bracket mounted to the intermediate barrel with an image pickup device of FIG. 3. In these drawings, reference character [5A] denotes a plan view, reference character [5B] denotes a plan view of the mounting surface, reference character [5C] denotes a plan view on the hanging bracket side and reference character [5D] denotes a side view, respectively.

As shown in FIG. 3, the intermediate barrel with an image pickup device 1 which is an accessory device of the present embodiment is provided with an image pickup unit incorporating the image pickup device 11 (see FIG. 3 and FIG. 4 [4A]) and a drive circuit (not shown) that drives this, and a battery (not shown) which is a power supply battery or the like. Furthermore, as described above, the intermediate barrel with an image pickup device 1 includes the mount ring 12 on the front to mount the interchangeable lens barrel 7 (not shown in FIG. 3 or the like; see FIG. 1 and FIG. 2). Note that a mount index 12b (see FIG. 3, FIG. 4 [4A]) is provided at a predetermined position of the mount surface 12a of the mount ring 12. This mount index 12b serves as an index indicating the mounting position when the lens barrel 7 is mounted to the intermediate barrel with an image pickup device 1.

With such a configuration, the intermediate barrel with an image pickup device 1 is configured to be able to attach/detach an interchangeable lens barrel generally provided for conventional lens interchangeable cameras and alternatively mount and utilize a plurality of types of interchangeable lens barrels. The intermediate barrel with an image pickup device 1 is configured by including an adapter mounting section 19, to the rear face of which the mounting adapter 4 is mounted.

The intermediate barrel with an image pickup device 1 is constructed of a body section 10 which has a substantially cylindrical shape as a whole, an inner component (not shown; image pickup unit or the like) of the body section 10 and components (various operation members or the like) provided on an outer circumference of the body section 10.

The body section 10 is formed into a substantially cylindrical shape, has an opening 10a on the front side which is one side in its Z-axis direction (see FIG. 3) with the other direction on the rear side being closed. As described above, the interior of the body section 10 includes the image pickup unit including the image pickup device 11 and the drive circuit (not shown) that drives this, the control circuit that controls the entire intermediate barrel with an image pickup device 1 comprehensively and a signal processing circuit or the like (not shown) that performs signal processing on an image signal acquired by the image pickup device 11 and communication signals of various modes exchanged with an external device such as the portable type electronic device 3.

Note that as the above-described image pickup device 11, various conventionally commercialized general devices are used such as a photoelectric conversion element such as CCD (charge coupled device) image sensor or CMOS (complementary metal oxide semiconductor) type image sensor.

The mount ring 12 is disposed at the opening 10a of the body section 10, which secures a mechanical connection with the interchangeable lens barrel 7 mounted on the intermediate barrel with an image pickup device 1 (not shown in FIG. 3; see FIG. 1 and FIG. 2). A plurality of electric contacts 13 for securing an electrical connection between the interchangeable lens barrel 7 mounted to the intermediate barrel with an image pickup device 1 and an inner electronic circuit of the intermediate barrel with an image pickup device 1 are disposed inside the body section 10 and in the vicinity of the inner edge of the mount ring 12. Note that the image pickup device 11 disposed inside the intermediate barrel with an image pickup device 1 has a light receiving surface disposed to be oriented toward the above-described opening 10a.

Various operation members are provided on the outer surface of the body section 10. For example, a release operation member 15 that operates in connection with a release switch when performing an image pickup operation and a power supply operation member 17 that operates in connection with a power switch are disposed on the top surface (see reference character [4B] in FIG. 4) on the outer surface of the body section 10.

Furthermore, a lens releasing operation button 14 which is an operation member when releasing the interchangeable lens barrel 7 (see FIG. 1 and FIG. 2) mounted to the front of the intermediate barrel with an image pickup device 1 and an adapter releasing operation button 18 when releasing the mounting adapter 4 (not shown in FIG. 3 or FIG. 4; see FIG. 1 and FIG. 2) mounted to the rear face of the intermediate barrel with an image pickup device 1 are disposed on the right side face of the body section 10 (see reference character [4E] in FIG. 4).

The above-described lens releasing operation button 14 is an operation member which operates in connection with the lock pin 30, a predetermined length region on the distal end side from the mount surface 12a of the mount ring 12 toward the outside of which is provided so as to be freely projectable/retractable. Here, the lens releasing operation button 14 and the lock pin 30 or the like constitute a lens unlocking mechanism that unlocks a rotation locked state of the interchangeable lens barrel 7 mounted to the front of the intermediate barrel with an image pickup device 1.

The above-described adapter releasing operation button 18 is an operation member that operates in connection with a stopper pin 31 (see [4E] and [4F] in FIG. 4), a region of a predetermined length on the distal end side from the surface of the adapter mounting section 19 to the outside of which is provided so as to be freely projectable/retractable. Here, the adapter releasing operation button 18 and the stopper pin 31 or the like constitute an adapter unlocking mechanism that unlocks a rotation locked state of the lens barrel 7 to remove the mounting adapter 4 (not shown in FIG. 3 or the like; see FIG. 1 and FIG. 2) attached to the rear face of the intermediate barrel with an image pickup device 1.

On the other hand, hanging bracket mounting sections 16 for detachably disposing a strap mounting hanging bracket 100 (not shown in FIG. 3; see FIG. 5) are formed on both sides (see reference characters [4D] and [4E]) of the body section 10, respectively. A tripod screw hole 20 is formed on the bottom surface (see reference character [4C]) of the body section 10.

Here, the strap mounting hanging bracket 100 will be described using FIG. 5. The strap mounting hanging bracket 100 is a hanging metal fitting for attaching a strap or the like and is constructed of a hanging bracket body 102 that engages with the hanging bracket mounting section 16 of the body section 10 and is provided with a predetermined lock mechanism and a loop-shaped hanging bracket 101 or the like for passing the strap.

The lock mechanism of the strap mounting hanging bracket 100 is configured as follows. That is, an engagement lug part 102a urged by an urging member (not shown) in a direction orthogonal to the axial direction of the hanging bracket body 102 (that is, toward the diameter direction of the hanging bracket body 102) is formed at the distal end portion of the hanging bracket body 102. The distal end side of the engagement lug part 102a has a cross section which is formed into a tapered shape inclined toward the distal end.

In contrast, a circumferential groove (not shown) is formed inside the hanging bracket mounting section 16 on the body section 10 side.

Here, the hole of the hanging bracket mounting section 16 is formed to have a diameter slightly smaller than the outside diameter of the engagement lug part 102a of the hanging bracket body 102. The inner circumferential groove is formed to have a diameter slightly greater than the hole diameter of the hanging bracket mounting section 16.

Therefore, with such a configuration, when the hanging bracket body 102 is inserted into the hanging bracket mounting section 16 on the body section 10 side, the engagement lug part 102a contracts in diameter against the urging force while the distal end tapered part is sliding over the inner wall surface of the hanging bracket mounting section 16. This allows even the engagement lug part 102a having a greater diameter than the hole diameter of the hanging bracket mounting section 16 to be inserted into the hanging bracket mounting section 16. When the engagement lug part 102a reaches the inner circumferential groove of the hanging bracket mounting section 16, the engagement lug part 102a is restored to its original mode from the contracted state by its own urging force. When the engagement lug part 102a engages with the inner circumferential groove of the hanging bracket mounting section 16, the strap mounting hanging bracket 100 is mounted to the hanging bracket mounting section 16 without being removed.

In order to remove the mounted strap mounting hanging bracket 100 from the hanging bracket mounting section 16, by, for example, pressing or pulling the head 102b of the hanging bracket body 102 of the strap mounting hanging bracket 100 to the body section 10 side, it is possible to cause the engagement lug part 102a to contract in diameter against the urging force. Therefore, since engagement between the engagement lug part 102a and the inner circumferential groove of the hanging bracket mounting section 16 is released in this way, it is possible to pull out the strap mounting hanging bracket 100.

Note that regarding the configuration of the strap mounting hanging bracket 100, a configuration substantially similar to one applied for conventionally popular electronic devices is assumed to be used and further detailed description thereof is omitted. In addition, without being limited to the above-described mode, a mode using screws or the like may also be used.

Returning to FIG. 4, an adapter mounting section 19 which becomes a connection section to connect and fix the front side of the mounting adapter 4 (see FIG. 1 and FIG. 2) to the rear face of the intermediate barrel with an image pickup device 1 is formed on the rear face side of the body section 10 (see reference character [4F]). The adapter mounting section 19 is formed into a convex shape, a cross section of which protrudes rearward in a substantially tapered shape, so that the front side connection section of the mounting adapter 4 of the present embodiment engages therewith. A plurality of bayonet lugs 19a that form part of an attaching/detaching mechanism that makes the mounting adapter 4 of the present embodiment freely attachable/detachable to/from the intermediate barrel with an image pickup device 1 are formed on the outer surface and the outer circumferential edge of the adapter mounting section 19 (see FIG. 4). The present embodiment shows an example of case where four bayonet lugs 19a are arranged at intervals of an angle of approximately 90 degrees in a circumferential direction. These plural (four) bayonet lugs 19a are components that bayonet-couple with a bayonet engagement section 41 (see FIG. 6 or the like which will be described later) formed on an outer circumferential edge of a front side connection section of the mounting adapter 4 of the present embodiment.

Note that a wireless ON/OFF operation member 22 that operates in connection with a wireless switch for turning ON/OFF the state of use of wireless communication carried out between the intermediate barrel with an image pickup device 1 and an external device (e.g., above-described portable type electronic device 3) and a connector 23 for securing an electrical connection with another external device via a cable (e.g., USB cable), transmitting various kinds of data and supplying power from an external power supply apparatus to a battery or the like are disposed on the rear face of the intermediate barrel with an image pickup device 1 (see reference character [4F] in FIG. 4). Note that a general standard product such as a mini-USB connector or a micro-USB connector can be used as the connector 23.

An index 10x is provided in the vicinity of the edge closer to the rear end on one side face of the intermediate barrel with an image pickup device 1 on the outer circumferential surface of the body section 10 of the intermediate barrel with an image pickup device 1 as shown, for example, in FIG. 1 to FIG. 4. The index 10x is an index provided for positioning a mount position when the mounting adapter 4 is mounted to the intermediate barrel with an image pickup device 1. A seal, impression, molding or the like is used for the index 10x which is formed and colored in white, red or the like so that the user can easily recognize it. At least one index 10x may be provided at a predetermined position on the outer circumferential surface of the body section 10.

Note that as described above, the present embodiment implements bayonet coupling between the intermediate barrel with an image pickup device 1 and the mounting adapter 4 by causing the four bayonet lugs 19a to engage with the four bayonet engagement sections 41. In this case, locations of engagement between the bayonet lugs 19a and the bayonet engagement sections 41 are provided at intervals of an angle of approximately 90 degrees in the circumferential direction.

Therefore, according to this configuration, the intermediate barrel with an image pickup device 1 can be attached to the mounting adapter 4 at four locations. More specifically, for example, as shown in FIG. 1, it is possible to adopt a mode though not shown in which the intermediate barrel with an image pickup device 1 is mounted to mounting adapter 4 so that the image pickup device 11 is arranged in a portrait position in addition to the normal mode in which the intermediate barrel with an image pickup device 1 is mounted to the mounting adapter 4 so that the image pickup device 11 is arranged in a landscape mode. Thus, to cover a plurality of modes of attachment between the intermediate barrel with an image pickup device 1 and the mounting adapter 4, for example, a total of four indexes 10x may be provided on the outer circumferential surface of the body section 10 at intervals of an angle of approximately 90 degrees in the circumferential direction. This is the schematic configuration of the intermediate barrel with an image pickup device 1 which is the accessory device of the present embodiment.

The intermediate barrel with an image pickup device 1 configured as described above is an apparatus that can function as an image pickup apparatus (camera) per se if the interchangeable lens barrel 7 is mounted to the front thereof.

Although further detailed illustration and description of the intermediate barrel with an image pickup device 1 in the present embodiment will be omitted, the internal configuration other than the aforementioned configuration includes, for example, a power-supply-related configuration unit including, for example, a power supply battery (charging type battery or the like), a data storage unit including a storage medium or the like, a simple display unit capable of displaying the device state such as a power supply state, and a communication unit that communicates with an external device to receive a control signal or transmit image data.

Since the intermediate barrel with an image pickup device 1 can freely attach/detach the lens barrel 7, when the lens barrel 7 is removed, the light receiving surface of the image pickup device 11 is exposed to the outside. Thus, although not illustrated, for a time when the lens barrel 7 is removed from the intermediate barrel with an image pickup device 1 or when the intermediate barrel with an image pickup device 1 is carried or stored as a single unit, a protective cap or the like is provided to cover the opening 10a and protect the inside thereof.

Furthermore, the intermediate barrel with an image pickup device 1 may be provided with a dust removing apparatus (dust-proof mechanism) for removing dust from the light receiving surface by brushing off dust sticking to the light receiving surface side of the image pickup device 11. As this type of the dust removing apparatus, there is a configuration in which, for example, a transparent thin-plate dust-proof member is provided in the space on the front side of the image pickup device 11 (alternatively, a filter member originally provided on the light receiving surface of the image pickup device 11, for example, an infrared cut filter or low-pass filter may be used), a predetermined space on the front side of the image pickup device 11 is hermetically sealed, the above-described plate-like member is made to vibrate using an exciting member such as piezoelectric element and dust or the like sticking to the dust-proof member is thereby removed. As this type of the dust removing apparatus, a device in generally widespread use such as a conventional image pickup apparatus (camera) may be used. The intermediate barrel with an image pickup device 1 of the present embodiment is configured as described above.

[Configuration of Mounting Adapter]

Next, the configuration of the mounting adapter 4 of the present embodiment will be described below using mainly FIG. 6 to FIG. 14.

[Schematic Configuration of Mounting Adapter]

Figure 6:
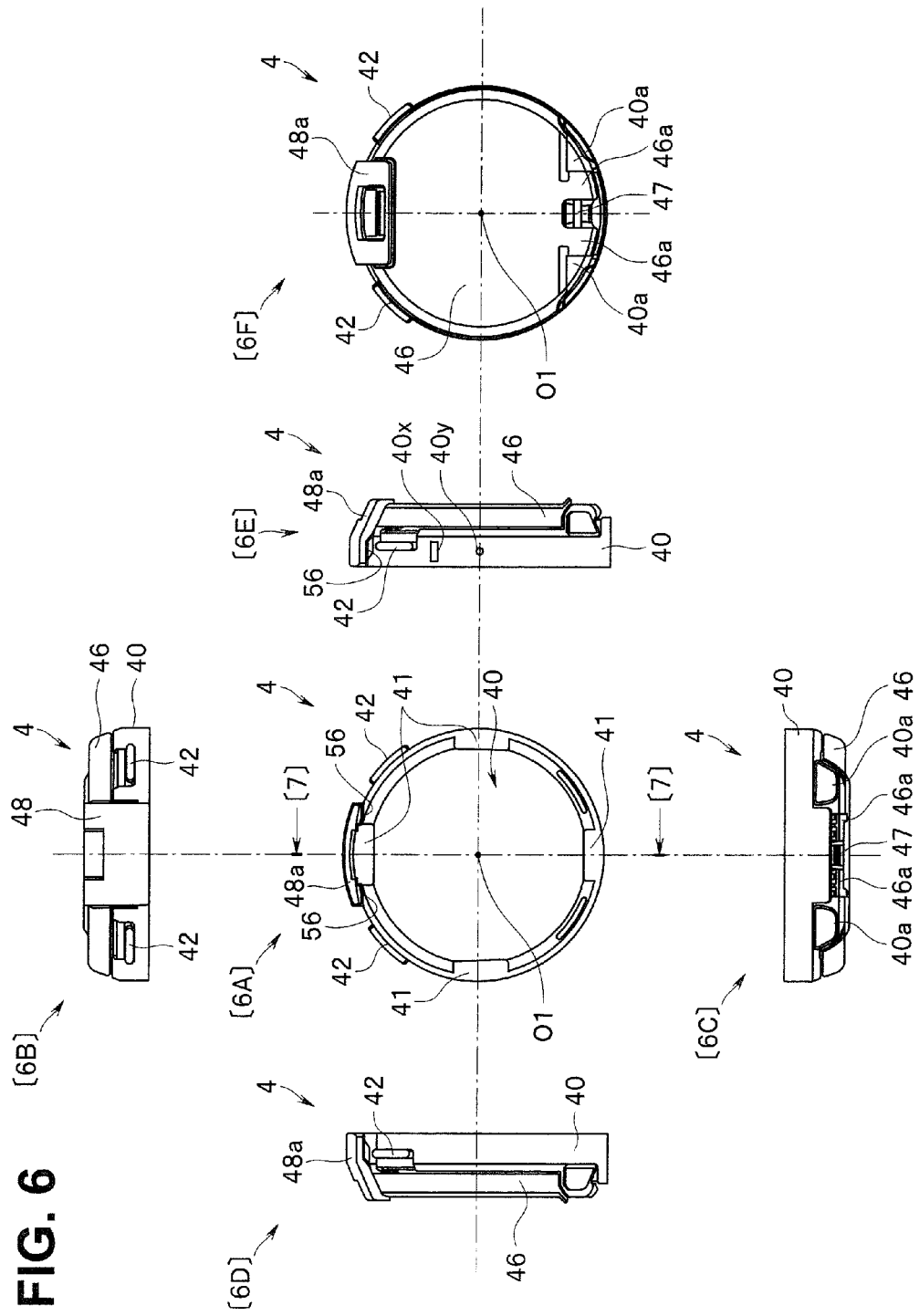
FIG. 6 is a six-sided view of the mounting adapter (when a closed state) according to the embodiment of the present invention.

First, a schematic configuration of the mounting adapter 4 of the present embodiment will be described below using mainly FIG. 6. FIG. 6 is a six-sided view of the mounting adapter (in a closed state) according to the present embodiment. Of these drawings, reference character [6A] denotes a front view, reference character [6B] denotes a top view, reference character [6C] denotes a bottom view, reference character [6D] denotes a left side view, reference character [6E] denotes a right side view, and reference character [6F] denotes a rear view, respectively.

The mounting adapter 4 of the present embodiment is a configuration unit for connecting devices to construct an image pickup system made up of a plurality of devices as described above (see FIG. 1 and FIG. 2). A specific example is a device mounting apparatus configured in such a way that the intermediate barrel with an image pickup device 1 is mounted to a connection section on the front side and the portable type electronic device 3 is sandwiched on the rear face side so as to hold the portable type electronic device 3. When the mounting adapter 4 of the present embodiment is used, in such a state, the portable type electronic device 3 is configured to be held with the image display surface being inclined with respect to the optical axis O of the lens barrel 7 attached to the intermediate barrel with an image pickup device 1 (see FIG. 1 and FIG. 2 or the like).

Figure 13:
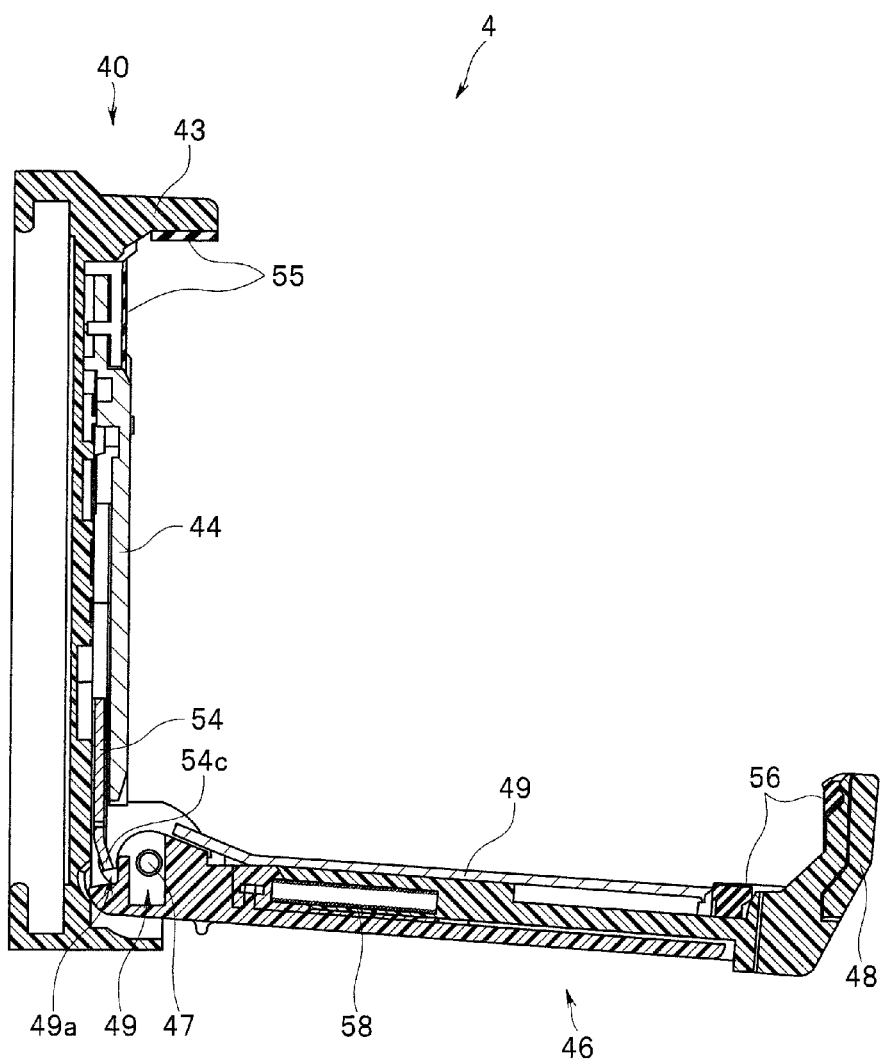
FIG. 13 is a central longitudinal cross-sectional view illustrating a cross section of the mounting adapter according to the embodiment of the present invention in an open state when in use when the support cover is in a first opening position.
Figure 14:
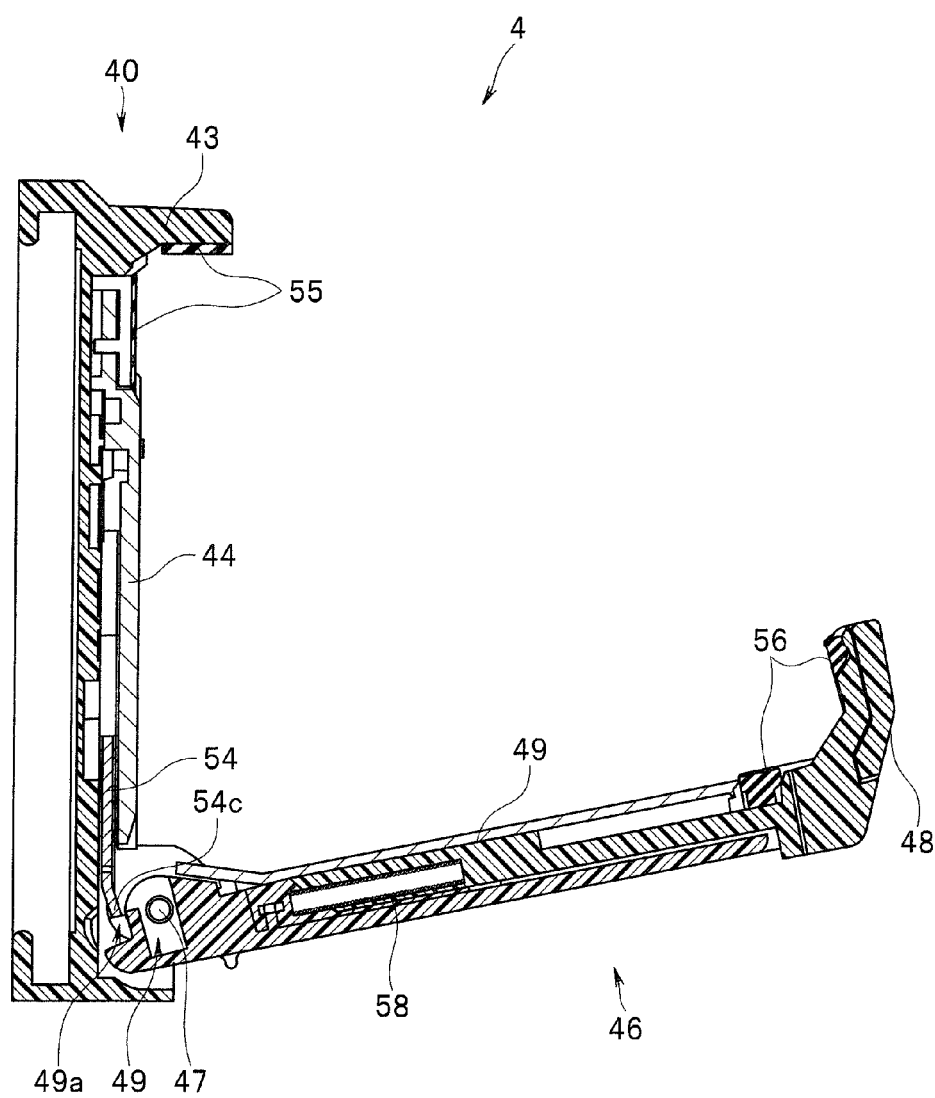
FIG. 14 is a central longitudinal cross-sectional view illustrating a cross section of the mounting adapter according to the embodiment of the present invention in an open state when in use when the support cover is in a second opening position.

As shown in FIG. 6, the mounting adapter 4 of the present embodiment is constructed of an adapter body 40 which is a first body section and a support cover 46 which is a second body section. Here, the adapter body 40 and the support cover 46 are pivotally supported by a spindle 47 (see reference character [6F] in FIG. 6) which constitutes a hinge member. With such a configuration, the mounting adapter 4 of the present embodiment is configured to displace between a closed state when not in use and an open state when in use. Here, the closed state when not in use is a state in which the front side of the support cover 46 (second body section) is placed so as to face the rear face side (other side) of the adapter body 40 (first body section) and superimposed thereon. On the other hand, the open state when in use is a state in which the adapter body 40 (first body section) and the support cover 46 (second body section) are arranged so as to have a predetermined angle between both around the hinge member as a center of rotation. Although details will be described later, the mounting adapter 4 of the present embodiment in the open state when in use is configured as shown in FIG. 13 and FIG. 14 so that the mounting adapter 4 can be set in two modes with different opening angles of the support cover 46.

Note that part of the above-described spindle 47 is disposed so as to be exposed to the outside. In this case, the exposed part of the spindle 47 is configured to allow a strap to pass therethrough. With such a configuration, the spindle 47 functions as a support axis in the hinge member between the adapter body 40 and the support cover 46 and at the same time functions as a strap mounting section as well.

The adapter body 40 is configured to be able to provide bayonet coupling between the connection section on the front side thereof and the adapter mounting section 19 (see FIG. 2 and FIG. 4 or the like) on the rear face of the intermediate barrel with an image pickup device 1. For such a configuration, a plurality of bayonet engagement sections 41 are formed as the connection section in the inner circumferential edge on the front side of the adapter body 40. The plurality of bayonet engagement sections 41 correspond to a bayonet coupling section that engages with the plurality of (four) bayonet lugs 19a of the adapter mounting section 19 as described above. In the present embodiment, four bayonet engagement sections 41 are formed at intervals of an angle of approximately 90 degrees in the circumferential direction of the adapter body 40 in accordance with the positions and the number of locations (four locations) of the plurality of bayonet lugs 19a.

Furthermore, a first holding arm 43 (not shown in FIG. 6; see FIG. 7 or the like which will be described later) is provided so as to protrude rearward, which comes into contact with a region of the outer edge of the portable type electronic device 3 (more specifically, one side (one side face) of the portable type electronic device 3) and holds this when the adapter body 40 is set in an open position, that is, when in use, to the region turned 180 degrees in the circumferential direction with respect to the region of coupling (hinge member) with the support cover 46, that is, an outer circumferential edge on the side opposing across the central axis O1 of the mounting adapter 4 (point coinciding with the optical axis O; see reference characters [6A] and [6F] in FIG. 6). A distal end of this first holding arm 43 is formed into a hook shape and a holding part 43a, to an inner surface of which an elastic body 55 (not shown in FIG. 6; see FIG. 7 and FIG. 8 or the like) made of an elastic rubber member or the like as anti-slipping member is pasted, is disposed. Thus, first holding arm 43 holds part of the outer edge of the portable type electronic device 3 and the elastic body 55 comes into contact with part of the outer edge part of the portable type electronic device 3, thus providing a structure capable of reliably holding the portable type electronic device 3.

Furthermore, the adapter body 40 includes a plurality of opening operation buttons 42 which are operation members to cause the mounting adapter 4 in a closed state to displace to an open state. Here, the present embodiment shows an example where two opening operation buttons 42 are provided. More specifically, the opening operation buttons 42 are provided in the vicinity of the first holding arm 43 so as to sandwich the first holding arm 43 when the mounting adapter 4 is seen from the front (FIG. 6 [6A]) or from the rear face (FIG. 6 [6F]). The two opening operation buttons 42 are provided in a manner projectable or retractable in the diameter direction from the outer circumferential surface of the adapter body 40. Note that a configuration of the opening operation button 42 and a more specific configuration of an inner mechanism that operates in connection therewith will be described later (see FIG. 11 to FIG. 13).

The support cover 46 is rotatably attached to the adapter body 40 and configured to become a supporting part, when set in an open state with respect to the adapter body 40, for holding the other part of the outer edge part of the portable type electronic device 3 (more specifically, the other side face (other side face part) facing one side of the portable type electronic device 3) and to be set, when the portable type electronic device 3 is removed, in a closed state with respect to the adapter body 40 and thereby set in a stored state when not in use.

As shown in FIG. 6, the support cover 46 is pivotally supported to the adapter body 40 via a spindle 47 which is inserted and arranged in a hinge arm part 46*a*. Both ends of the spindle 47 are fixed to fixing parts 40*a* on the adapter body 40 side. A distal end hook part 48*a* of the second holding arm 48 is disposed at a position turned by an angle of approximately 180 degrees in the circumferential direction with respect to the region of coupling (hinge member) with the adapter body 40 in the support cover 46, that is, the outer circumferential edge on the side opposing across the central axis O1 (point that coincides with the optical axis O; see reference characters [9A] and [9F] in FIG. 6) of the mounting adapter 4. Although a more specific configuration of the second holding arm 48 will be described later, the distal end hook part 48*a* which is the distal end portion thereof is configured to come into contact with the other part (other side face part) of the outer edge of the portable type electronic device 3 so as to be able to reliably hold this, when the mounting adapter 4 is set in use where it is in a closed state. For this reason, the distal end hook part 48*a* is formed into a hook shape and the elastic body 56 made of an elastic rubber member or the like as an anti-slipping member (see FIG. 6 and FIG. 7) is pasted to the inner surface thereof. Thus, the distal end hook part 48*a* of the second holding arm 48 is configured to hold the other part (other side face part) of the outer edge of the portable type electronic device 3, and the elastic body 56 is configured to come into contact with the other part (other side face part) of the outer edge of the portable type electronic device 3 so as to be able to reliably hold the portable type electronic device 3. Furthermore, when the mounting adapter 4 is in a closed state, the distal end hook part 48*a* of the second holding arm 48 is disposed on the outer circumferential edge of the adapter body 40 at the position covering the outer surface region of the first holding arm 43. In this case, the distal end hook part 48*a* engages with the outer surface region of the first holding arm 43, and so the mounting adapter 4 is configured to remain in a closed state.

Note that as shown in FIG. 1 to FIG. 3 and FIG. 6, a first index 40*x* is provided on the outer circumferential surface of the adapter body 40 of the mounting adapter 4, which is an index provided for positioning the mounting position when the mounting adapter 4 is mounted to the intermediate barrel with an image pickup device 1 in a predetermined region and corresponding to the index 10*x* on the intermediate barrel with an image pickup device 1 side. A second index 40*y* indicating a state of coupling between the mounting adapter 4 and the intermediate barrel with an image pickup device 1 is provided in the vicinity of the first index 40*x*. Seal, impression, molding or the like is used for these indexes 40*x* and 40*y* as in the case of the index 10*x* which are formed, colored in white, red or the like so that the user can easily recognize them. Here, the first index 40*x* and the second index 40*y* are shown, for example, in different shapes and colors or the like. For example, the first index 40*x* is formed in the same shape (rectangular shape in the example in the drawing) and the same color as those of the index 10*x* and the second index is formed in a shape (round shape in the example in the drawing) and a color different from those in the index 10*x*.

Thus, it is possible to easily perform relative positioning when both the intermediate barrel with an image pickup device 1 and the mounting adapter 4 are coupled by providing predetermined indexes for both of them. That is, when the mounting adapter 4 is mounted to the intermediate barrel with an image pickup device 1, first, these are placed so as to face each other in such a way that the index 10*x* coincides with the first index 40*x*. Then, the bayonet engagement sections 41 on the mounting adapter 4 side are arranged in the vicinity of the bayonet lugs 19*a* on the intermediate barrel with an image pickup device 1 side. In this condition, the mounting adapter 4 and the intermediate barrel with an image pickup device 1 are made to relatively rotate. Then, the bayonet engagement sections 41 engage with the respective bayonet lugs 19*a*. When both are completely engaged with each other, the index 10*x* on the intermediate barrel with an image pickup device 1 side coincides with the second index 40*y* on the mounting adapter 4 side as shown in FIG. 1 and FIG. 2 or the like. This allows the user to visually confirm that the intermediate barrel with an image pickup device 1 and the mounting adapter 4 are regularly connected.

Note that as described above, in order for the intermediate barrel with an image pickup device 1 to be attached to the mounting adapter 4 in a plurality of modes, in correspondence with a plurality of indexes 10*x* on the intermediate barrel with an image pickup device 1 side, the same numbers of first indexes 40*x* and second indexes 40*y* may be provided at the corresponding positions.

[More Specific Inner Configuration of Mounting Adapter]

Figure 7:
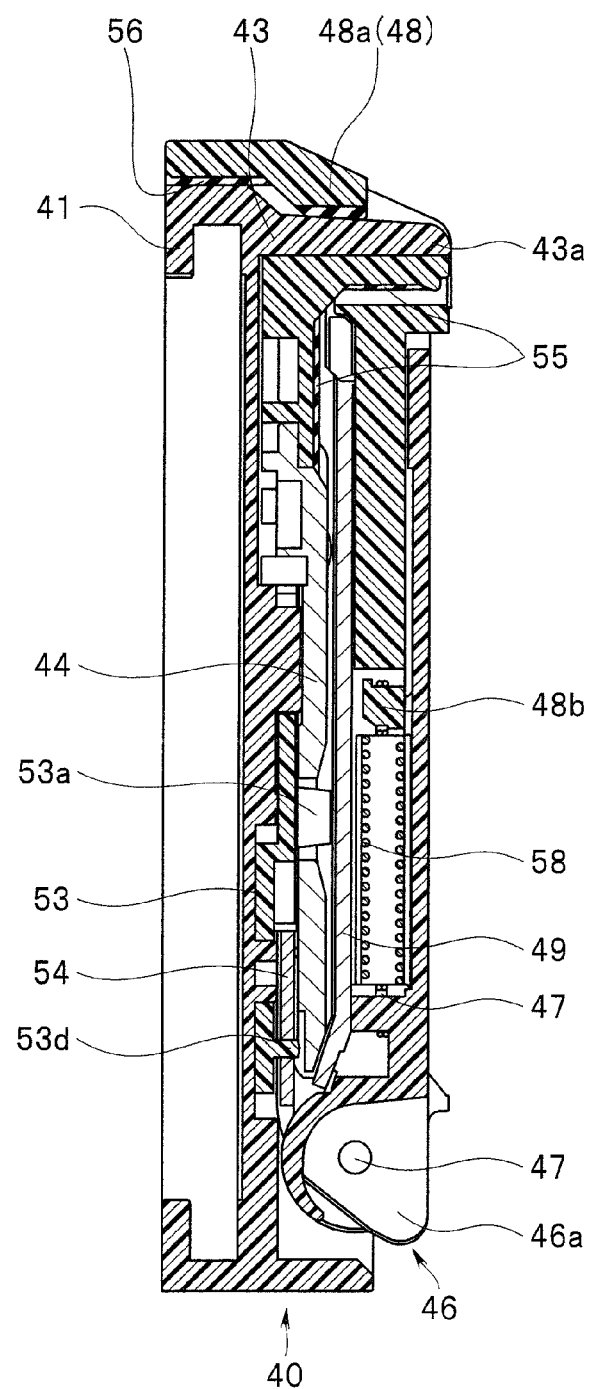
FIG. 7 is a cross-sectional view along a line [7]-[7] of FIG. 6.
Figure 8:
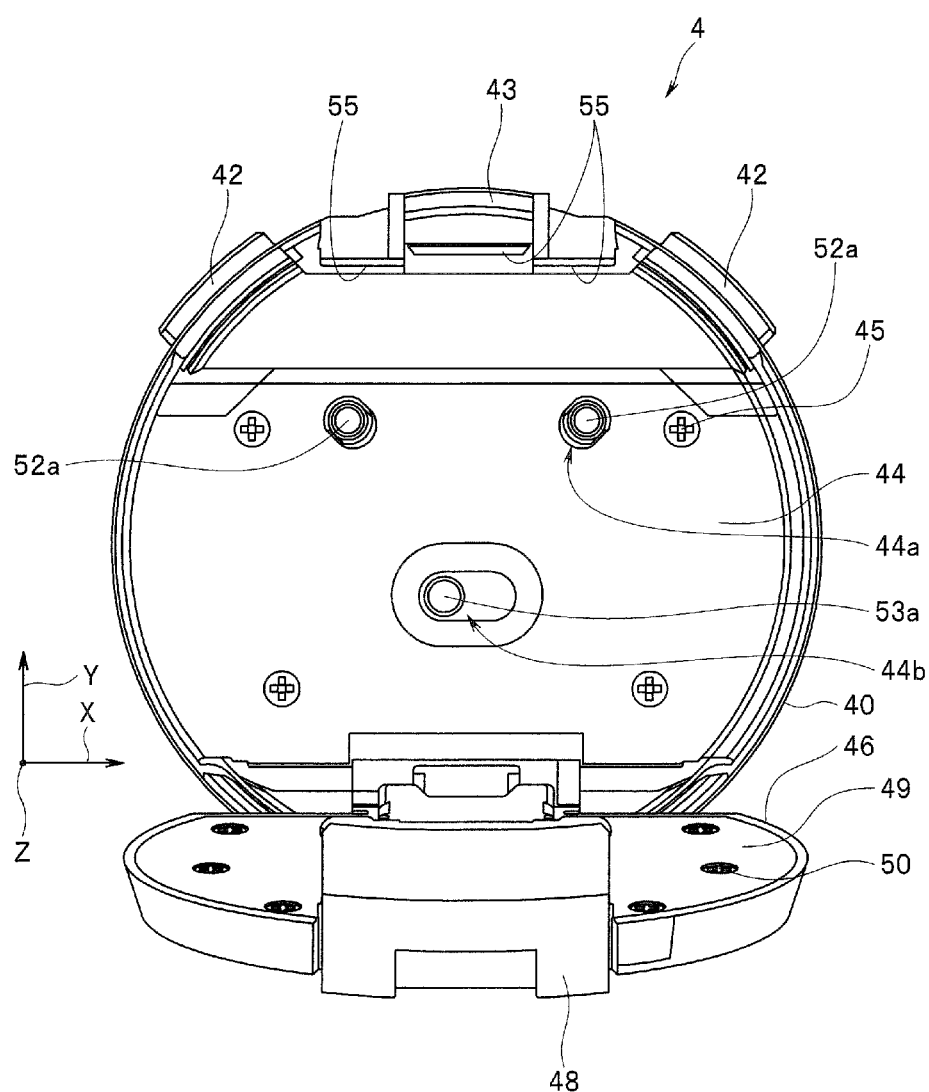
FIG. 8 is a rear view when the mounting adapter of FIG. 6 is in an open state.
Figure 9:
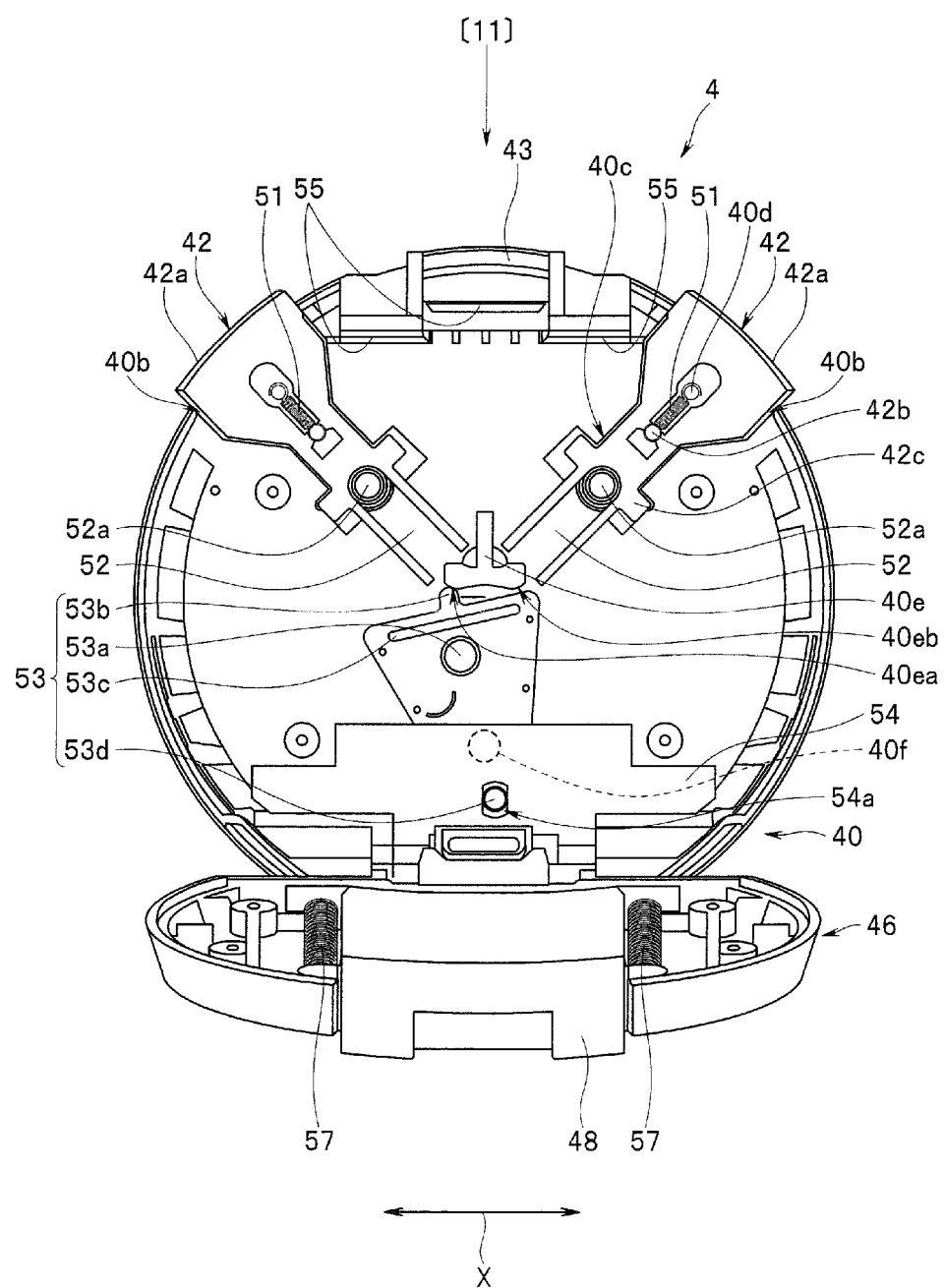
FIG. 9 is an arrow view seen from an arrow [9] direction of FIG. 11.
Figure 10:
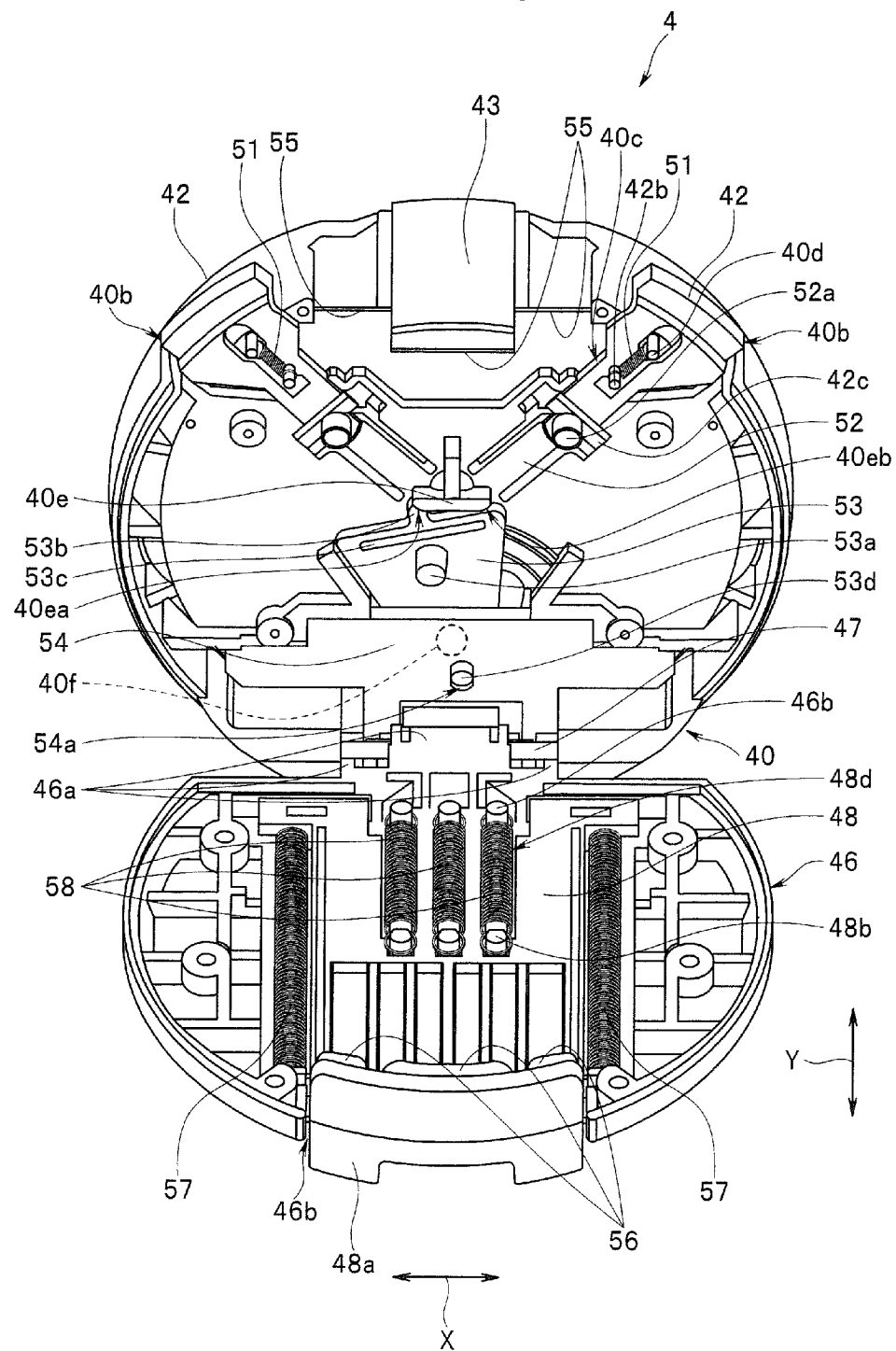
FIG. 10 is a perspective view simultaneously showing internal configurations of an adapter body and a support cover of the mounting adapter in the state shown in FIG. 9.
Figure 11:
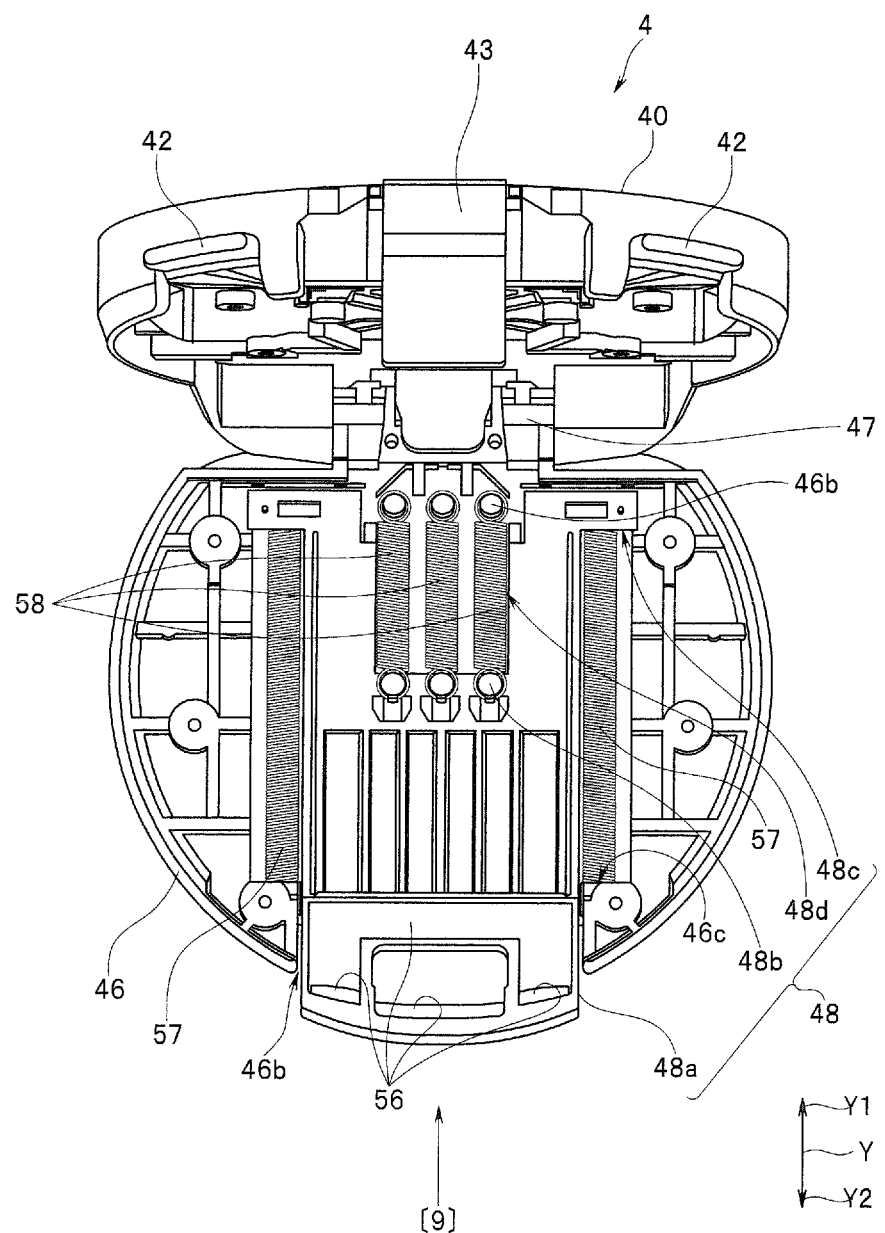
FIG. 11 is an arrow view seen from an arrow [11] direction of FIG. 9.
Figure 12:
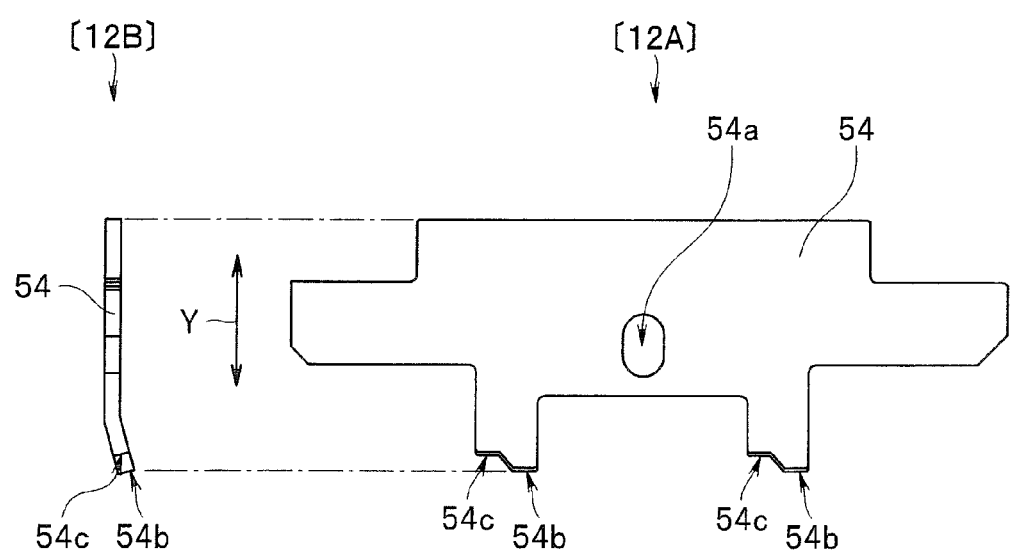
FIG. 12 is a diagram illustrating only a support cover opening angle adjusting member taken out, which is provided inside the adapter body of the mounting adapter according to the embodiment of the present invention.

Here, a more specific internal configuration of the mounting adapter 4 of the present embodiment will be described below. FIG. 7 is a central longitudinal cross-sectional view of the mounting adapter of the present embodiment (closed state). FIG. 7 shows a cross section along a line [7]-[7] of FIG. 6. FIG. 8 is a rear view when the mounting adapter of the present embodiment is set in an opened state. FIG. 9 is an internal configuration diagram showing an internal configuration mainly of the adapter body when some parts (external parts) are removed from the mounting adapter in the state in FIG. 8. FIG. 9 is an arrow view seen from an arrow [9] direction of FIG. 11. FIG. 10 is a perspective view simultaneously showing internal configurations of the adapter body and a support cover of the mounting adapter when some parts (external parts) are removed therefrom. FIG. 11 is a diagram illustrating an internal configuration mainly of the support cover when some parts (external parts) are removed from the mounting adapter. FIG. 11 is an arrow view seen from an arrow [11] direction of FIG. 9. FIG. 12 is a diagram illustrating only a support cover opening angle adjusting member provided inside the adapter body of the mounting adapter according to the embodiment taken out from the adapter body. Of these drawings, reference character [12A] shows a plan view and reference character [12B] shows a side view. FIG. 13 and FIG. 14 are central longitudinal cross-sectional views showing two aspects when the mounting adapter of the present embodiment is used in an open state. Of them, FIG. 13 shows a state in which the support cover is in a first opening position and FIG. 14 shows a state in which the support cover is in a second opening position.

A closed state unlocking mechanism for making the support cover 46 open to the adapter body 40 and an opening angle switching mechanism for switching the aspect of the open state of the support cover 46 with respect to the adapter body 40 are provided inside the adapter body 40 in the mounting adapter 4 of the present embodiment. Furthermore, an extension mechanism for the second holding arm 48 that fixes and holds the portable type electronic device 3 (see FIG. 1 and FIG. 2) mounted to the mounting adapter 4 in cooperation with the first holding arm 43 on the adapter body 40 side is provided inside the support cover 46 in the mounting adapter 4.

[More Specific Inner Configuration on Adapter Body Side of Mounting Adapter (Closed State Unlocking Mechanism)]

In the more specific inner configuration on the adapter body 40 side of the mounting adapter 4, first, the closed state unlocking mechanism for making the support cover 46 open to the adapter body 40 will be described in detail below.

On the rear face side of the adapter body 40, as shown in FIG. 8, an inner structure is covered with a thin plate 44 which is an external part formed using, for example, a metal member. The thin plate 44 is fixed to a fixing part of the adapter body 40 with a plurality of screws 45. Here, FIG. 9 and FIG. 10 show an appearance with the screws 45 and the thin plate 44 removed. Using FIG. 9 and FIG. 10 or the like, the closed state unlocking mechanism in particular of the internal configuration of the adapter body 40 will be described in detail below.

In the adapter body 40, the closed state unlocking mechanism for making the support cover 46 open is constructed of an opening operation button 42, an opening operation button urging spring 51 and a pressing operation section 52 (part of the adapter body 40) or the like.

The opening operation button 42 is an operation member operated by the user when the adapter body 40 is in a closed state when not in use, to open the support cover 46. A plurality of opening operation buttons 42 (two in the present embodiment) are disposed and the two opening operation buttons 42 are formed independently of each other. The respective opening operation buttons 42 are configured to be completely identical. The two opening operation buttons 42 are set to be symmetric with respect to a straight line passing through substantially the center of the adapter body 40. The support cover 46 is configured to achieve predetermined operation, that is, an open state of the support cover 46 by the user operating only one of the two opening operation buttons 42. Therefore, although the configuration of only one of the two opening operation buttons 42 is described, the other also has completely the same configuration.

The opening operation button 42 is an operation member disposed so as to freely advance or retract within a predetermined region toward the diameter direction from the vicinity of substantially the center of the adapter body 40. An operation portion (section) 42a for the user to perform a pressing operation is formed at a distal end portion of the opening operation button 42, a pressing part 42c that acts on a pressing operation section 52 which will be described later is formed at a proximal end portion and a spring hook 42b which is a fixing part that locks one end of each opening operation button urging spring 51 (arranged one for each button) which will be described later is formed in a middle region (see FIG. 9 in particular).

Accordingly, a notch 40b (two locations) for causing each operation portion 42a to project/retract in a predetermined region of the outer circumferential edge is formed on the adapter body 40 side, each opening operation button 42 (two locations) is placed on a planar part on the rear face side respectively, a guide groove 40c (two locations) for guiding advancement/retraction of each operation button in the diameter direction is formed, and further a spring hook pin 40d (two pins) for hooking the other end of each opening operation button urging spring 51 is implanted.

The pressing part 42c at the proximal end portion of the opening operation button 42 is a region that acts on the pressing operation section 52 as described above. For this reason, the pressing part 42c is formed with a slope that can slide, opposing and in contact with a slope of the pressing part 52a in accordance with the shape of the pressing part 52a (which will be described later) of the pressing operation section 52. That is, the pressing part 42c is formed with a slope oriented toward the distal end rear face side in a predetermined region from the distal end portion of the opening operation button 42.

The opening operation button urging spring 51 is an urging member that always urges the opening operation button 42 outward in the diameter direction of the adapter body 40. One end of this opening operation button urging spring 51 is locked at the spring hook 42b of the opening operation button 42 and the other end is locked at the spring hook pin 40d of the adapter body 40. A taut coil spring or the like is used for the opening operation button urging spring 51. One opening operation button urging spring 51 is disposed for each of the two opening operation buttons 42.

The pressing operation section 52 is an arm-like component formed in a cantilever shape in a region formed in part of the adapter body 40 from the vicinity of substantially the center of the adapter body 40 in the diameter direction. This pressing operation section 52 has its proximal end portion in the vicinity of substantially the center of the adapter body 40 and is formed to be elastically deformable so as to warp in a direction substantially orthogonal to the plane of the adapter body 40 on the rear face side with the proximal end portion as a fulcrum, toward the rear face side of the adapter body 40 in particular. A pressing part 52a of a substantially spherical shape which is convex toward the rear face side of the adapter body 40 is formed at the distal end portion of the pressing operation section 52. When the opening operation button 42 acts on the pressing operation section 52 (which will be described later), that is, when the opening operation button 42 is pressed in the retracting direction, this pressing part 52a is configured to move, in response thereto, projecting from the plane on the rear face side of the adapter body 40 toward the rear face side and protruding outward via a hole 44a (see FIG. 8) formed in the thin plate 44. Thus, when the adapter body 40 is in a closed state when not in use, the pressing part 52a protrudes when the operation portion 42a of the opening operation button 42 is pressed and pushes the support cover 46, thereby making it possible to set the mounting adapter 4 in an open state when in use.

For that reason, the back side of the pressing part 52a of the pressing operation section 52 is formed into a slope that gradually inclines toward the diameter direction. Here, the back side slope of the pressing part 52a has an inclination toward the distal end rear face from the region close to the proximal end in a predetermined region from the distal end portion of the pressing operation section 52. The pressing part 52a and the pressing part 42c are arranged so that the slope of the pressing part 52a is opposed to and comes into contact with the slope of the pressing part 42c of the opening operation button 42. Note that, the same number of, that is, two pressing operation sections 52 are fumed in correspondence with the two opening operation buttons 42.

The operation of the closed state unlocking mechanism configured in this way will be described briefly below. When in an actual use, the mounting adapter 4 is mounted to the rear face side of the intermediate barrel with an image pickup device 1 and the lens barrel 7 is normally mounted to the front face of the intermediate barrel with an image pickup device 1.

First, suppose the mounting adapter 4 is in a closed state. In this closed state, the user presses one operation portion 42a of one of the two opening operation buttons 42 in the diameter direction of the mounting adapter 4. That is, the user pushes in the operation portion 42a with a force resisting the urging force of the opening operation button urging spring 51. Then, the pressed opening operation button 42 slides along the guide groove 40c by a predetermined amount in the diameter direction of the mounting adapter 4. In this way, the slope of the pressing part 42c at the proximal end portion of the opening operation button 42 comes into contact with the slope at the distal end of the pressing part 52a of the pressing operation section 52 and presses this in the same direction. Here, since the slope of the pressing part 42c is in contact with the slope of the pressing part 52a of the pressing operation section 52, when the pressing part 42c slides inward in the diameter direction, the pressing part 52a is pushed up along the slope, and as a result, the pressing part 52a moves toward the rear face side of the adapter body 40 in a direction in which it protrudes. That is, the pressing operation section 52 warps in a direction substantially orthogonal to the plane on the rear face side of the adapter body 40 with the proximal end portion as a fulcrum, toward the rear face side of the adapter body 40. Therefore, the pressing part 52a of the pressing operation section 52 moves toward the rear face side of the adapter body 40 and juts out rearward from the surface of the thin plate 44 via the hole 44a (see FIG. 8). Then, the pressing part 52a comes into contact with the surface of the thin plate 49 (which will be described later; see FIG. 8) of the support cover 46 which is disposed opposite to the rear face (thin plate 44) of the adapter body 40 and in a closed state, and presses this in the same direction.

Here, when the mounting adapter 4 is in a closed state, the distal end hook part 48a of the second holding arm 48 of the support cover 46 is locked on the outer surface part of the first holding arm 43 of the adapter body 40. Therefore, when the pressing part 52a of the pressing operation section 52 presses the surface (which will be described later; see FIG. 8) of the thin plate 49 of the support cover 46 as described above, the locking state between the second holding arm 48 and the first holding arm 43 is unlocked. In this way, the mounting adapter 4 is changed to an open state.

On the other hand, to change the mounting adapter 4 from an open state to a closed state, the user rotates the support cover 46 toward the closing direction around the spindle 47 as a center of rotation and places one side of the support cover 46 (surface of the thin plate 49) opposite to the rear cover 46 of the adapter body 40 (surface of the thin plate 44). The distal end hook part 48a of the second holding arm 48 of the support cover 46 is engaged with the first holding arm 43 of the adapter body 40. In this way, the mounting adapter 4 is set in a closed state.

According to the closed state unlocking mechanism configured as described above, the mounting adapter 4 can be easily set in an open state by only pressing any one of the two opening operation buttons 42. Therefore, the user can set the mounting adapter 4 of the present embodiment in an open state by one hand, and so even while holding the intermediate barrel with an image pickup device 1 with the mounting adapter 4 and the lens barrel 7 mounted thereto by one hand and holding another device (portable type electronic device 3) to be mounted by the other hand, the user can easily perform an opening operation on the mounting adapter 4 by one hand operation.

Two opening operation buttons 42 are provided and these two opening operation buttons 42 are configured to have independent but identical modes so that operating either button can achieve a desired operation (opening operation on the support cover 46). Therefore, according to such a configuration, no matter by which of the left hand or right hand the user holds the intermediate barrel with an image pickup device 1 already mounted to the mounting adapter 4, the user can easily operate the opening operation button 42. That is, it is possible to secure excellent operability irrespective of the user's dominant hand.

[More Specific Inner Configuration of Mounting Adapter on Adapter Body Side (Opening Angle Switching Mechanism)]

Next, regarding a more specific inner configuration of the mounting adapter 4 on the adapter body 40 side, an opening angle switching mechanism will be described in detail whereby an aspect of the open state of the support cover 46 with respect to the adapter body 40 is changed.

As described above, as an aspect when the mounting adapter 4 of the present embodiment is set in an open state, the mounting adapter 4 is configured so that the opening angle of the support cover 46 with respect to the adapter body 40 can be set to two aspects. The opening angle switching mechanism described hereinafter is a mechanism for changing the aspect of the open state of the support cover 46 with respect to the adapter body 40. Note that FIG. 13 and FIG. 14 show two exemplary aspects of the open state of the mounting adapter 4. FIG. 13 illustrates an aspect of the mounting adapter 4 in which the opening angle of the support cover 46 with respect to the adapter body 40 becomes greater. Suppose the position of the support cover 46 in the state shown in FIG. 13 is designated as a first opening position. FIG. 14 illustrates another aspect of the mounting adapter 4 in which the opening angle of the support cover 46 with respect to the adapter body 40 becomes smaller compared to the aspect in FIG. 13. Suppose the position of the support cover 46 in the state shown in FIG. 14 is designated as a second opening position.

In this way, the reason that the opening angle of the support cover 46 is configured to be changeable with respect to the adapter body 40 is a measure for responding to the mode of the portable type electronic device 3 mounted between the support cover 46 and the adapter body 40. That is, when the aspect in FIG. 13 (large opening angle) is adopted, it is possible to mount a relatively large portable type electronic device. On the other hand, when the aspect in FIG. 14 (small opening angle) is adopted, it is possible to adapt to a relatively small portable type electronic device compared to the case in FIG. 13.

In the mounting adapter 4 of the present embodiment, as shown in FIG. 9 and FIG. 10, the opening angle switching mechanism for switching the opening angle of the support cover 46 with respect to the adapter body 40 is constructed of a switching lever 53, a switching plate member 54, a lever locking part 40e (part of the adapter body 40), a locking lug part 49a (part of the thin plate 49; not shown in FIG. 9 and FIG. 10, see FIG. 13 and FIG. 14) or the like.

As shown in FIG. 9 or the like, the switching lever 53 is a lever member made of a substantially tabular member formed in a substantially triangle shape by injection-molding, for example, a resin member. The switching lever 53 is disposed with the vertex oriented downward and the base disposed in the vicinity of a substantially central part of the adapter body 40. The substantially central part of the switching lever 53 is disposed to be freely rotatable around a support shaft 40f formed in the adapter body 40 as a center of rotation.

The switching lever 53 is constructed by forming a slide operation knob 53a, a locking convex part 53b, a fine groove part 53c and a switching plate locking convex part 53d at respective predetermined regions.

The slide operation knob 53a is an operation region for the user to switch the opening angle of the mounting adapter 4 and to be directly operated by the hand or fingers. This slide operation knob 53a is formed so as to project backward from the surface of the switching lever 53. The slide operation knob 53a is disposed so as to project backward and outward from the hole 44b (see FIG. 8) formed in the thin plate 44. Here, the hole 44b is formed into a substantially ellipsoidal shape with an ellipse being set in a direction along the X-axis so as to allow the slide operation knob 53a to rotate.

The locking convex part 53b is a locked part that regulates the position of the switching lever 53 by being locked by a lever locking part 40e (details of which will be described later).

The fine groove part 53c is a notch formed to allow elastic displacement of the locking convex part 53b when the locking state between the locking convex part 53b and the lever locking part 40e is switched. That is, by providing the fine groove part 53c in the region of the switching lever 53 that receives a pressure from the outside, that is, in the vicinity of the locking convex part 53b, it is possible to provide a flat spring effect. Therefore, when the switchover operation by the switching lever 53 is performed in this configuration, if the locking convex part 53b is pressed by the lever locking part 40e, the locking convex part 53b is configured to be easily elastically displaced and warped so as to allow the switchover of the locking state with respect to the lever locking part 40e.

The switching plate locking convex part 53d is a component that acts on a switching plate member 54 (details will be described later) and moves the switching plate member 54 in the X-axis direction. The switching plate locking convex part 53d is a convex region that is fitted into a locking hole 54a of the switching plate member 54. The switching plate locking convex part 53d is a component formed at the center of rotation of the switching lever 53, that is, in an opposing region facing the region of the slide operation knob 53a across the region corresponding to the support shaft 40f. Therefore, when the switching lever 53 is rotated by sliding operation of the slide operation knob 53a, the switching plate member 54 is configured to move in a direction opposite to the sliding operation.

On the other hand, since the lever locking part 40e is intended to lock the locking convex part 53b of the switching lever 53 at a predetermined position, the lever locking part 40e is formed on the surface of the rear face side of the adapter body 40. The lever locking part 40e is formed to have two convex parts formed to face the locking convex part 53b. Note that since the present embodiment adopts a mechanism of switching the opening angle in two aspects, the locking convex parts 53b are placed and locked at both ends 40ea and 40eb (see FIG. 9 and FIG. 10) of the lever locking part 40e, respectively, and the locking convex parts 53b are thereby configured so that the respective predetermined positions are maintained and the respective desired aspects are set.

As shown in FIG. 7, FIG. 8 and FIG. 9 or the like, the switching plate member 54 is an opening angle setting member formed using, for example, a metal plate member. A locking hole 54a into which the switching plate locking convex part 53d of the switching lever 53 is fitted is formed at substantially the center of this switching plate member 54. Note that the locking hole 54a is formed into an ellipsoidal shape having a major axis in the Y-axis direction to allow the switching lever 53 to rotate when moving the switching plate member 54 in the X-axis direction.

With the locking lug part 49a (details of which will be described later; not shown in FIG. 9 and FIG. 10; see FIG. 13 and FIG. 14) being in contact therewith, the switching plate member 54 is formed by including angle setting steps 54b and 54c to switch the opening angle of the support cover 46. Here, the angle setting steps 54b and 54c are a plurality of steps formed at a distal end of the arm part that protrudes outward from the switching plate member 54 in a direction along the Y-axis as shown in FIG. 11.

The locking lug part 49a is a region formed on a proximal end side (rotation center side) of the thin plate 49 (which will be described later; see FIG. 8) which is an external part covering the surface of the support cover 46. When the support cover 46 is in an open state, this locking lug part 49a is a locked part that comes into contact with any one of the angle setting steps 54b and 54c of the switching plate member 54 to thereby restrict the support cover 46 from further rotating in the opening direction. When the locking lug part 49a comes into contact with any one of the angle setting steps 54b and 54c, the opening angle of the support cover 46 with respect to the adapter body 40 is set in this way. By providing a plurality of angle setting steps of the switching plate member 54, aspects of the support cover 46 with different open states are implemented.

More specifically, for example, when the support cover 46 is in an open state, rotates around the spindle 47 as the center of rotation and the locking lug part 49a comes into contact with the angle setting step 54c, this state is as shown in FIG. 10. In this case, the support cover 46 is set to an aspect with a large opening angle.

On the other hand, when the support cover 46 is in an open state, rotates around the spindle 47 as the center of rotation and the locking lug part 49a comes into contact with the angle setting step 54b, this state is as shown in FIG. 14. In this case, the support cover 46 is set to an aspect with a small opening angle.

Operation by the opening angle switching mechanism configured in this way will be described in brief below. First, when the mounting adapter 4 is in a closed state, the support cover 46 is displaced to an open state through a pressing operation of the opening operation button 42 as described above. Then, the slide operation knob 53a of the switching lever 53 is exposed to the outside and can be operated. In this condition, the user slides the operation knob 53a in the X-axis direction.

Here, suppose the operation knob 53a is in the position shown, for example, in FIG. 8, that is, the operation knob 53a is located at the left end in the hole 44b. In this case, the switching lever 53 and the switching plate member 54 are in conditions shown in FIG. 9 and FIG. 10. Therefore, when the support cover 46 is rotated to a maximum opening position, the locking lug part 49a stays in contact with the angle setting step 54c of the switching plate member 54. That is, in this condition, the support cover 46 is set in an aspect with a large opening angle with respect to the adapter body 40, that is, the state shown in FIG. 10.

In this condition, in order to switch the opening angle setting, the user slides the operation knob 53a in the X-axis direction to position the operation knob 53a at the right end in the hole 44b in FIG. 8 or the like. Then, the switching lever 53 rotates clockwise around the support shaft 40f as the center of rotation in FIG. 9 or the like. During this rotation, the locking convex part 53b moves from a state in which it is in contact with one end 40ea of the lever locking part 40e to a state in which it comes into contact with the other end 40eb. In this case, the locking convex part 53b gets over the two convex parts of the lever locking part 40e. For this reason, the locking convex part 53b absorbs the pressure of the two protruding portions by an elastic force generated by the fine groove part 53c. The locking convex part 53b is then locked by the other end 40eb of the lever locking part 40e and the position thereof is maintained.

In this way, when the switching lever 53 is rotated, the switching plate member 54 simultaneously moves in the X-axis direction. Thus, when the support cover 46 is rotated to a maximum opening position, the locking lug part 49a comes into contact with the angle setting step 54b of the switching plate member 54. That is, in this condition, the support cover 46 takes on an aspect with a small opening angle with respect to the adapter body 40, that is, the state shown in FIG. 14.

According to the opening angle switching mechanism configured as described above, it is possible to change the setting of the opening angle of the support cover 46 with respect to the adapter body in the mounting adapter 4 to a plurality of aspects.

Furthermore, as described above, the thin plate 49 and the switching plate member 54 are constructed using a metal plate member. With such a configuration, when the locking lug part 49a of the thin plate 49 comes into contact with any one of the angle setting steps 54b and 54c of the switching plate member 54, it is possible to secure sufficient strength.

Note that although a case has been illustrated in the above example where the opening angle is set in two aspects, but the present invention is not limited to this example. For example, in the present embodiment, the switching plate member 54 has two stages of angle setting steps, but if this is formed in multiple stages, it is possible to adapt to opening angle settings of other aspects. In that case, it is necessary to change the specification as appropriate such as matching the number of convex parts formed in the lever locking part 40e in the adapter body 40 to the number of steps of the above-described angle setting steps.

[More Specific Inner Configuration on Support Cover Side of Mounting Adapter (Extension Mechanism of Second Holding Arm)]

Next, in the more specific inner configuration on the support cover 46 side of the mounting adapter 4, an extension mechanism of the second holding arm 48 will be described in detail, which fixes and holds the portable type electronic device 3 (see FIG. 1 and FIG. 2) in cooperation with the first holding arm 43 on the adapter body 40 side.

Regarding the front side of the support cover 46 (which refers to the surface facing the rear face of the adapter body 40 when the mounting adapter 4 is in a closed state), the inner structure is covered with the thin plate 49 which is an external member formed using a metal plate member, for example, as shown in FIG. 8. The thin plate 49 is fixed to the fixing part of the support cover 46 by a plurality of screws 50. Here, FIG. 10 and FIG. 11 show a situation in which the screws 50 and the thin plate 49 are removed and an internal configuration of the support cover 46 will be described in detail using FIG. 10 and FIG. 11 or the like.

As shown in FIG. 10 and FIG. 11 or the like, the support cover 46 is internally constructed of the second holding arm 48, a first urging spring 57 and a second urging spring 58 or the like.

Inside the support cover 46, the second holding arm 48 is disposed to be freely slidable in a direction along the Y-axis (see arrow Y in FIG. 10 and FIG. 11) when the support cover 46 is in a closed state. For that reason, a guide groove 46b that defines and guides the sliding direction of the second holding arm 48 is formed inside the support cover 46.

The distal end hook part 48a formed into a hook shape is provided on the distal end side of the second holding arm 48. When the mounting adapter 4 is in a closed state as described above, this distal end hook part 48a engages with the outer surface region of the first holding arm 43 of the adapter body 40, keeping the mounting adapter 4 in the closed state (see FIG. 7 or the like). On the other hand, when the mounting adapter 4 is in an open state, the distal end hook part 48a fixes and holds the portable type electronic device 3 in cooperation with the first holding arm 43 on the adapter body 40 side (see FIG. 1 or the like). Note that an elastic body 56 is pasted to the inner surface of the distal end hook part 48a. This elastic body 56 serves as anti-slipping means by contacting the edge part of the portable type electronic device 3, making sure that the portable type electronic device 3 is fixed and held.

A first urging spring contact part 48c with which one end of each of the plurality of first urging springs 57 is in contact is formed on a proximal end side (closer to the hinge member) of the second holding arm 48. Note that the present embodiment provides a configuration with two first urging springs 57 as will be described later. Accordingly, two first urging spring contact parts 48c are provided.

The first urging spring contact part 48c is formed so as to protrude in a direction orthogonal to the moving direction of the second holding arm 48 (Y-axis direction) and outward from both sides of the proximal end side of the second holding arm 48. As will be described later, the first urging springs 57 (two springs) are disposed so as to move along both sides of the second holding arm 48 with each end thereof contacting each of the first urging spring contact parts 48c.

A notch 48d which is cut out into a substantially concave shape is formed in a middle region on the proximal end side of the second holding arm 48 and a region sandwiched by the two first urging spring contact parts 48c. A plurality (three in the present embodiment) of second urging springs 58 are arranged in this notch 48d as will be described later. In correspondence to this, a plurality (three) of spring hooks 48b for locking one end of each of the plurality (three) of second urging springs 58 are formed in the notch 48*d*. Furthermore, in correspondence to this, the same number of (three) spring hook fixing parts 46*b* are formed in a region on the support cover 46 side facing the spring hook 48*b* on the proximal end side in the Y-axis direction. Therefore, in this configuration, the plurality (three) of second urging springs 58 are arranged with each one end thereof hooked at each spring hook 48*b* and each other end thereof hooked at each spring hook fixing part 46*b*.

The first urging spring 57 and the second urging spring 58 are second holding arm urging members provided to urge the second holding arm 48 toward a direction along the Y-axis in the mounting adapter 4, in an arrow Y1 direction shown in FIG. 10 and FIG. 11. Urging members such as a plurality of coil springs are used as the first urging springs 57 and the second urging springs 58 which are the second holding arm urging members.

Here, as shown in FIG. 11 or as described above, the first urging springs 57 are disposed on both sides of the second holding arm 48 inside the support cover 46 along the slidable direction (direction parallel to the Y-axis) of the second holding arm 48. In this case, according to the present embodiment, one first urging spring 57 is disposed on one of both sides of the second holding arm 48. In this case, the two first urging springs 57 are disposed in a predetermined region of the support cover 46 with each one end thereof being in contact with each first urging spring contact part 48*c* of the second holding arm 48, and the other end thereof being in contact with a fixing part 46*c* of the support cover 46. In this condition, the first urging spring 57 is in a compressed state. Therefore, the second holding arm 48 is always urged in the arrow Y1 direction with respect to the fixing part 46*c* of the support cover 46 by an urging force in the extending direction of the first urging spring 57.

On the other hand, as shown in FIG. 11 or as described above, the second urging springs 58 are disposed in the notch 48*d* of the second holding arm 48 inside the support cover 46 along the slidable direction (direction parallel to the Y-axis) of the second holding arm 48. In this case, the present embodiment adopts a configuration in which three second urging springs 58 are arranged in parallel. The three second urging springs 58 are arranged in a predetermined region (that is, in the notch 48*d*) of the support cover 46, with each one end thereof being hooked at each spring hook 48*b* of the second holding arm 48 and each other end thereof being hooked at each spring hook fixing part 46*b* on the support cover 46 side. In this case, the second urging springs 58 remain in a state of tension. Therefore, the second holding arm 48 is always urged in the arrow Y1 direction with respect to the spring hook fixing part 46*b* of the support cover 46 by a tensile urging force of the second urging spring 58.

With such a configuration, the second holding arm 48 is always urged in the arrow Y1 direction with respect to the fixed regions (46*b* and 46*c*) of the support cover 46 by the urging forces of the first urging springs 57 (compression springs) and the second urging springs 58 (tensile springs).

Note that an aspect of the mounting adapter 4 of the present embodiment has been illustrated in which the first urging spring 57 is made up of a compression spring and the second urging spring 58 is made up of a tensile spring, but the present invention is not limited to this configuration. In addition to the above-described aspect of the embodiment, the first urging spring 57 may be made up of a tensile spring and the second urging spring 58 may be made up of a compression spring.

Operation of the extension mechanism of the second holding arm 48 in the mounting adapter 4 configured in this way will be described briefly below.

The user places the portable type electronic device 3 between the first holding arm 43 and the second holding arm 48 of the mounting adapter 4 which is in an open state and holds it therebetween, thus constituting one mode of the image pickup system. In this case, one side face edge part of the portable type electronic device 3 is caused to come into contact with the distal end hook shape region of the first holding arm 43 and then the other side face edge part of the portable type electronic device 3 is caused to come into contact with the distal end hook part 48*a* of the second holding arm 48. In this case, the second holding arm 48 is caused to extend against the urging force thereof so that the portable type electronic device 3 is successfully mounted between both holding arms 43 and 48. The portable type electronic device 3 is sandwiched between the first holding arm 43 and the second holding arm 48 of the mounting adapter 4.

That is, according to the size of the portable type electronic device 3, the second holding arm 48 is caused to extend in an arrow Y2 direction against the respective urging forces by the first urging spring 57 and the second urging spring 58. When the portable type electronic device 3 is interposed between the first holding arm 43 and the second holding arm 48, the urging forces of the first urging spring 57 and the second urging spring 58 reliably hold the portable type electronic device 3 via the distal end hook part 48*a* of the second holding arm 48. The holding state in this case is the mode shown in FIG. 1 and FIG. 2.

On the other hand, when the portable type electronic device 3 mounted to the mounting adapter 4 is removed, the user performs an operation of pulling the second holding arm 48 in the arrow Y2 direction via each edge part of the portable type electronic device 3 against the urging forces of the first urging spring 57 and the second urging spring 58. This allows the portable type electronic device 3 sandwiched between the first holding arm 43 and the second holding arm 48 to be easily removed.

As described so far, since the mounting adapter 4 of the above-described embodiment adopts an opening/closing type configuration in which the adapter body 40 and the support cover 46 are configured to be freely rotatable around the spindle 47 which is a hinge member as a center of rotation, it is possible to store the mounting adapter 4 in a closed state when not in use more compactly and contribute to space saving. On the other hand, when in use, the mounting adapter 4 is set in an open state, and it is possible to cause the two holding arms 43 and 48 to reliably sandwich the portable type electronic device 3 and maintain a reliable connection between the intermediate barrel with an image pickup device 1 and the portable type electronic device 3 via the mounting adapter 4.

When the mounting adapter 4 is caused to displace from a closed state to an open state, this can be done easily by only pressing at least one of a plurality (two) of opening operation buttons 42, and can thereby be done easily and reliably through one hand operation. Moreover, since a plurality (two) of opening operation buttons 42 are provided, it is possible to operate the mounting adapter 4 by the right hand or the left hand, with the same operational feeling, secure the same operational feeling irrespective of the dominant hand of the user, hence everybody can operate it easily and without unnatural feeling.

Furthermore, since the mounting adapter 4 of the present embodiment is provided with the opening angle switching mechanism for changing the opening angle setting of the support cover 46 with respect to the adapter body 40, it is possible to select a desired open state aspect from a plurality of open state aspects and thereby adapt to various sizes of portable type electronic devices 3.

Since the mounting adapter 4 of the present embodiment is provided with stable operability even when operated by one hand, the user can attach/detach the intermediate barrel with an image pickup device 1 which is an accessory device to/from the portable type electronic device 3, reliably and in short time through a simple operation.

Note that the present invention is not limited to the aforementioned embodiment, and it goes without saying that various modifications and applications can be made without departing from the spirit and scope of the present invention. The aforementioned embodiment includes inventions in various stages, and various inventions can be extracted depending on appropriate combinations of a plurality of disclosed components. For example, even when some components are deleted from all the components disclosed in the embodiment, it is possible to solve the problems to be solved by the invention, and if the effects of the invention can be obtained, the configuration without these deleted components can be extracted as the invention. The present invention is not restricted by any specific embodiment except being limited by the attached claims.

What is claimed is:

1. A mounting adapter that is interposed between an accessory device and a portable type electronic device for integrally connecting both devices, comprising:
    a first body section having a connection section attached to one surface of the accessory device and a first holding arm that holds one side face of the portable type electronic device;
    a second body section having a second holding arm that is movably provided so as to project/retract from inside to outside to hold another surface opposite to the one surface of the portable type electronic device;
    a second holding arm urging member that urges the second holding arm in a direction opposite to a direction in which the second holding arm projects outward; and
    a hinge member that connects the first body section and the second body section,
    wherein when the mounting adapter is in an open state when in use, the mounting adapter sandwiches the portable type electronic device between the first holding arm and the second holding arm, and
    wherein when the portable type electronic device is sandwiched between the first holding arm and the second holding arm in the open state when in use, an image display surface of the portable type electronic device is disposed inclined with respect to a plane including the connection section of the first body section.

2. The mounting adapter according to claim 1, wherein the mounting adapter is displaced between a closed state when not in use in which the first body section and the second body section are arranged opposite to each other in a superimposed manner, and an open state when in use in which the first body section and the second body section are arranged with a predetermined opening angle around the hinge member as a center of rotation.

3. The mounting adapter according to claim 1,
    wherein the accessory device is an image pickup apparatus that comprises internally at least an image pickup device, a power supply battery and a communication section, comprises a mount section that can attach/detach an interchangeable lens barrel on a front face of the image pickup apparatus, and comprises at least a release operation member and power supply operation member disposed on an outer face of the image pickup apparatus,
    the portable type electronic device comprises at least a control section, a communication section and an image display section, and
    the mounting adapter is interposed between the accessory device and the portable type electronic device to integrally connect both devices.

4. The mounting adapter according to claim 1,
    wherein the first holding arm and the second holding arm respectively further comprise a distal end hook part formed into a substantially hook shape at a distal end portion and an anti-slipping elastic body pasted to an inner surface of the distal end hook part, and
    in the open state when in use, when the portable type electronic device is sandwiched between the first holding arm and the second holding arm, each edge part of the portable type electronic device comes into contact with the elastic body.

5. The mounting adapter according to claim 1, further comprising an opening angle switching mechanism that switches a setting of an opening angle of the second body section with respect to the first body section.

6. The mounting adapter according to claim 5,
    wherein the opening angle switching mechanism comprises:
    a switching lever member that includes a switching operation portion that performs a switching operation and is pivotally supported on a plane of the first body section;
    an opening angle setting member that includes a plurality of setting sections that set the opening angle of the second body section with respect to the first body section and translates along the plane of the first body section operating in connection with rotation of the switching lever member; and
    a locked part that defines an opening angle of the second body section in contact with any one of the plurality of setting sections of the opening angle setting member.

7. The mounting adapter according to claim 6,
    wherein the opening angle switching mechanism further comprises a lever locking part that locks the switching lever member and positions the switching lever member with respect to the first body section.

8. The mounting adapter according to claim 1,
    wherein when the first body section and the second body section are in a closed state when not in use, the second holding arm is disposed so as to cover the first holding arm and the distal end hook part of the second holding part engages with an outer circumferential edge part of the first body section.

9. The mounting adapter according to claim 1,
    wherein the first body section further comprises a closed state unlocking mechanism that releases engagement by the second body section and causes the mounting adapter to displace to an open state.

10. The mounting adapter according to claim 9,
    wherein the closed state unlocking mechanism comprises:
    an opening operation member that is disposed to be freely slidable in a diameter direction of the first body section to release a closed state of the second body section with respect to the first body section;

an urging member that urges the opening operation member outward in the diameter direction of the first body section; and a pressing operation section that is formed to be elastically deformable in a direction orthogonal to the diameter direction of the first body section, a proximal end portion of the opening operation member coming into contact with the pressing operation section with a pressure of the opening operation member acting on the pressing operation section.

11. The mounting adapter according to claim 9, wherein the closed state unlocking mechanism is provided in plurality, and when only one of the closed state unlocking mechanisms is operated, a closed state of the second body section with respect to the first body section is released.

12. The mounting adapter according to claim 1, wherein the second holding arm urging member comprises a plurality of coil springs.

13. The mounting adapter according to claim 1, wherein the second holding arm urging member comprises:

a first urging spring formed of one of a compression spring and a tensile spring; and a second urging spring formed of one of a tensile spring and a compression spring.

14. The mounting adapter according to claim 13, wherein the first urging spring and the second urging spring each comprise a plurality of coil springs.

15. A mounting adapter that is interposed between an accessory device and a portable type electronic device for integrally connecting both devices, comprising:

a first body section having a connection section attached to one surface of the accessory device and a first holding arm that holds one side face of the portable type electronic device;

a second body section having a second holding arm that is movably provided so as to project/retract from inside to outside to hold another surface opposite to the one surface of the portable type electronic device;

a second holding arm urging member that urges the second holding arm in a direction opposite to a direction in which the second holding arm projects outward;

a hinge member that connects the first body section and the second body section; and an opening angle switching mechanism that switches a setting of an opening angle of the second body section with respect to the first body section, wherein when the mounting adapter is in an open state when in use, the mounting adapter sandwiches the portable type electronic device between the first holding arm and the second holding arm.

16. The mounting adapter according to claim 15, wherein the opening angle switching mechanism comprises:

a switching lever member that includes a switching operation portion that performs a switching operation and is pivotally supported on a plane of the first body section;

an opening angle setting member that includes a plurality of setting sections that set the opening angle of the second body section with respect to the first body section and translates along the plane of the first body section operating in connection with rotation of the switching lever member; and a locked part that defines an opening angle of the second body section in contact with any one of the plurality of setting sections of the opening angle setting member.

17. The mounting adapter according to claim 16, wherein the opening angle switching mechanism further comprises a lever locking part that locks the switching lever member and positions the switching lever member with respect to the first body section.

18. A mounting adapter that is interposed between an accessory device and a portable type electronic device for integrally connecting both devices, comprising:

a first body section having a connection section attached to one surface of the accessory device and a first holding arm that holds one side face of the portable type electronic device;

a second body section having a second holding arm that is movably provided so as to project/retract from inside to outside to hold another surface opposite to the one surface of the portable type electronic device;

a second holding arm urging member that urges the second holding arm in a direction opposite to a direction in which the second holding arm projects outward; and a hinge member that connects the first body section and the second body section, wherein when the mounting adapter is in an open state when in use, the mounting adapter sandwiches the portable type electronic device between the first holding arm and the second holding arm, and wherein the first body section further comprises a closed state unlocking mechanism that releases engagement by the second body section and causes the mounting adapter to displace to an open state.

19. The mounting adapter according to claim 18, wherein the closed state unlocking mechanism comprises:

an opening operation member that is disposed to be freely slidable in a diameter direction of the first body section to release a closed state of the second body section with respect to the first body section;

an urging member that urges the opening operation member outward in the diameter direction of the first body section; and a pressing operation section that is formed to be elastically deformable in a direction orthogonal to the diameter direction of the first body section, a proximal end portion of the opening operation member coming into contact with the pressing operation section with a pressure of the opening operation member acting on the pressing operation section.

20. The mounting adapter according to claim 18, wherein the closed state unlocking mechanism is provided in plurality, and when only one of the closed state unlocking mechanisms is operated, a closed state of the second body section with respect to the first body section is released.

* * * * *